United States Patent
Nakamura et al.

(10) Patent No.: US 6,799,742 B2
(45) Date of Patent: Oct. 5, 2004

(54) SOLAR PANEL FOR SPACE AND METHOD FOR MANUFACTURING THE SAME

(75) Inventors: Kazuyo Nakamura, Nara (JP); Tatsuo Saga, Nara (JP); Kunio Kamimura, Kashiba (JP); Tadashi Hisamatsu, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 319 days.

(21) Appl. No.: 10/000,488

(22) Filed: Dec. 4, 2001

(65) Prior Publication Data

US 2002/0066828 A1 Jun. 6, 2002

(30) Foreign Application Priority Data

Dec. 5, 2000 (JP) .................................... P2000-369663

(51) Int. Cl.$^7$ .......................... B64G 1/44; H01L 31/048
(52) U.S. Cl. ...................... 244/173; 136/292; 136/244; 136/245; 136/246
(58) Field of Search .................... 244/173; 136/292, 136/244, 245, 246

(56) References Cited

U.S. PATENT DOCUMENTS

| | | | | |
|---|---|---|---|---|
| 5,180,442 A | * | 1/1993 | Elias .......................... 136/251 |
| 5,223,044 A | * | 6/1993 | Asai ........................... 136/255 |
| 5,720,452 A | * | 2/1998 | Mutschler, Jr. ............. 244/173 |
| 5,961,738 A | * | 10/1999 | Benton et al. .............. 136/245 |
| 5,990,414 A | * | 11/1999 | Posnansky .................. 136/244 |
| 6,399,874 B1 | * | 6/2002 | Olah .......................... 136/259 |
| 6,407,327 B1 | * | 6/2002 | Ralph et al. ................ 136/244 |
| 6,465,724 B1 | * | 10/2002 | Garvison et al. ........... 136/244 |
| 6,489,552 B2 | * | 12/2002 | Yamawaki et al. ......... 136/251 |
| 6,501,013 B1 | * | 12/2002 | Dinwoodie ................. 136/251 |

FOREIGN PATENT DOCUMENTS

JP     6-275857     9/1994

\* cited by examiner

*Primary Examiner*—J. Woodrow Eldred
(74) *Attorney, Agent, or Firm*—Nixon & Vanderhye P.C.

(57) ABSTRACT

The object of the invention is to provide a solar panel and a method for manufacturing the same, wherein the manufacture of the solar panel for use in space and repair work thereon can be performed easily and in little time. An entirety of the solar panel is configured by detachably linking a plurality of unit solar cell modules, which include a plurality of solar cells and connection wires for connecting the solar cells, and electrically connecting the unit solar cell modules to one another. Thus, a solar panel can be easily fabricated by combining standardized unit solar cell modules. Moreover, by simply mechanically connecting the unit solar cell modules, they can be electrically connected, and thus the time necessary for manufacture or repair of solar panels can be shortened.

24 Claims, 22 Drawing Sheets

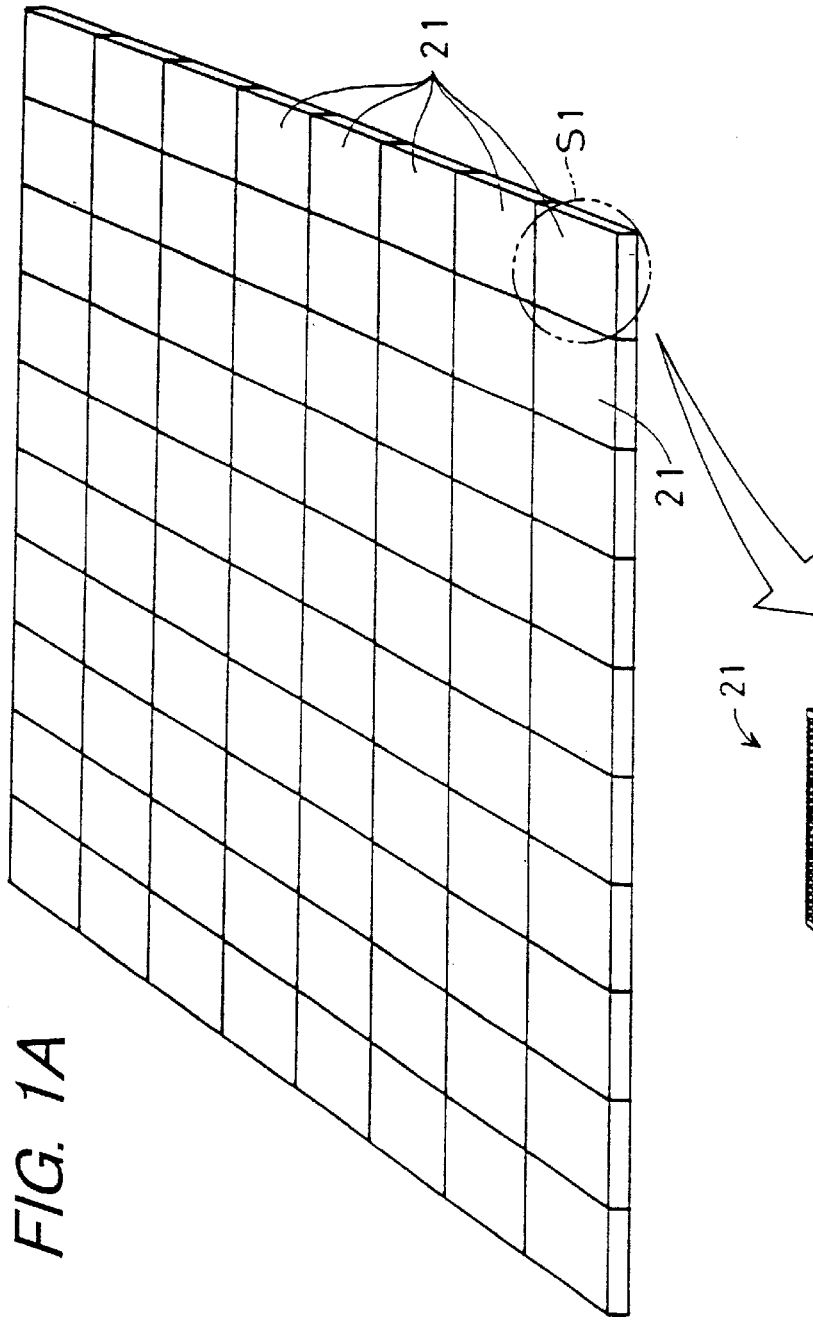
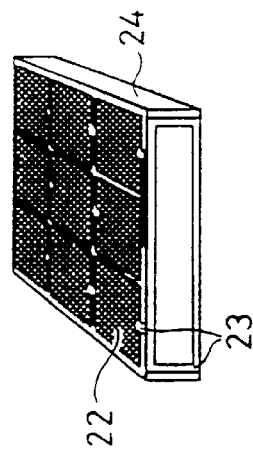
FIG. 1A
FIG. 1B

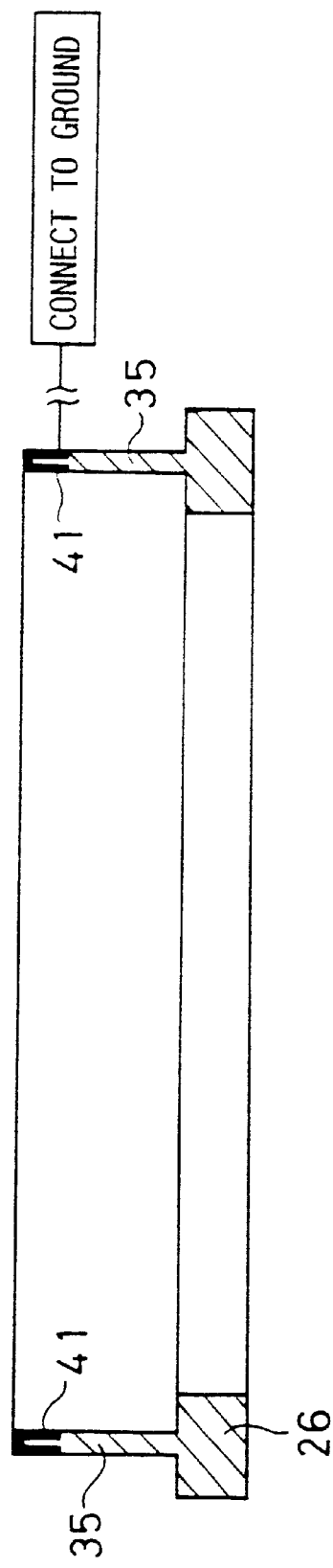

SOLAR PANEL FOR SPACE AND METHOD FOR MANUFACTURING THE SAME

BACKGROUND OF THE INVENTION

1. Field of the Invention

The present invention relates to a solar panel which is mounted to an artificial satellite or a space station, for example, for use in space.

2. Description of Related Art

FIG. 27 is a schematic view showing a conventional artificial satellite 1. As shown in FIG. 27, the artificial satellite 1 uses space solar panels 3, and has solar paddles 2, which protrude like wings from the left and right of a substantially cylindrical artificial satellite body 5 and are used as a power source of the artificial satellite body 5.

The solar paddle 2 is composed of solar panels 3 which are connected with one another via hinges, which solar panels are integrally structured units that are not allowed to be folded. The electrical circuit of the solar panel 3 is usually connected directly to a bus line. The solar panel 3 is normally about 3 m×3.5 m in size and made up of several thousands to several tens of thousands of solar cells. The artificial satellite 1 is transported into space with the solar paddle 2 stored (folded up), and then spread out when the artificial satellite 1 reaches space.

FIG. 28 is an enlarged front view of section S28 (solar panel portion) of the solar paddles 2 in FIG. 27. As shown in FIG. 28, a large number of solar cells 4 are attached to the surface of the solar panels 3. FIG. 29 is an enlarged front view of section S29 of the solar panel 3 of FIG. 28. As shown in FIG. 29, the solar cells 4 are arranged in a matrix form and connected to one another by a current path 6 for collecting generated electricity. The solar cells 4 are provided with cover glass sheets 7, and to prevent the cover glass sheets 7 from being charged by cosmic rays, for example, they are connected to ground wires 8, which are connected to the satellite ground of the artificial satellite 1.

FIG. 30 is across sectional view taken along the section line A—A of FIG. 29. The solar cells 4 are fixed to a support plate (substrate) 11 by an adhesive 10. The solar cells 4 have a solar cell body 9 and a cover glass sheet 7, which is attached to the light receiving side of the solar cell body 9. The support plate 11 is a honeycomb-structure made of aluminum, for example, and the solar cells 4 are attached to the surface of the support plate.

This type of conventional space solar panel 3 is disclosed in Japanese Unexamined Patent Publication JP-A 6-275857 (1994), for example. In an ordinary solar panel, as represented by this disclosure, several thousand to several tens of thousands of solar panels that are approximately 4 cm×6 cm, for example, are arranged on a support plate (substrate) with a honeycomb structure made of aluminum. Furthermore, conductive links called inter-connectors, which electrically connect the solar cells to one another, are sandwiched between the solar cells and the surface of the support plate.

The cover glass sheets, which are provided tightly adhered to the light-receiving surface of the solar cells, are coated with a conductive film, and are linked by conductive linking wiring that electrically connects them to one another.

At this time, an irreversible connection technique such as welding or soldering is used as the method for electrically connecting the solar cells to the conductive links, and for electrically connecting each cover glass sheet to the conductive linking wiring. Moreover, an irreversible connection method using an adhesive, for example, is used also as means for disposing the solar cells and the conductive links on the support plate.

Irreversibly connecting the components that configure the solar panel in this way ensures that they are highly reliable with respect to vibration generated during the artificial satellite's transport into space and in the environment of space.

With this conventional technique, the manufacturing of a solar panel for space includes the task of adhering all of the several thousand to several tens of thousands of solar cells making up the solar panels to the support plate with an adhesive. Moreover, the task of electrically connecting all of the wiring for electrically connecting the solar cells and for electrically connecting the cover glass sheets, which are closely adhered to the light receiving surface of the solar cells, is performed by welding or soldering.

Conventional solar panels for space are large and come in various shapes depending on their intended uses, and thus it is difficult to manufacture solar panels on an automated production line. Consequently, complex process steps and an enormous amount of time are required to manufacture solar panels for space.

Furthermore, almost all components making up conventional space solar panels are joined together with an irreversible method, and therefore when problems, such as when the solar cells are damaged during the manufacturing or assembly steps, required solar panel repair work involving the replacement of solar cells, performing this replacement work is extremely difficult.

Replacement work involves first electrically disconnecting the solar cell from the solar panel by severing the metal wiring (inter-connector) that is welded, for example, between the solar cells to electrically connect them to one another. Next, the adhesive on the backside of the solar cell is cut and the solar cell is stripped from the solar panel. Then, a new solar cell slightly smaller than the created space is adhered to the stripped away space using an adhesive, and the wiring is reconnected by welding. The repair of solar panels involved performing these complex process steps.

This series of tasks is performed with respect to all of the numerous solar cells mounted on all regions of a solar panel each time a problem occurred, and becomes a large amount of work depending on the extent of the repair.

Furthermore, the increase in the size of artificial satellites has recently given rise to a demand for solar cells with a high photovoltaic efficiency, and thus the material for solar cells has changed from conventional silicon (Si) to III–V semiconductors such as gallium arsenide (GaAs). Normally, the crystal of III–V semiconductors is brittle and easily broken, and solar cells using such material have a higher percentage of cracking or chipping than Si solar cells. Even with conventional methods for manufacturing solar panels, this change to III–V semiconductors as the material for solar cells leads to an increased frequency of solar cell replacement or repair resulting from cracks in the solar cells.

Furthermore, heretofore the above-mentioned replacement work was performed on earth during the stage of manufacturing the solar panel or attaching it to the satellite. However, due to the recent progress in space technology, the environment is becoming one in which human beings can reside and work in space over comparatively long periods of time, for example collecting artificial satellites using manned space shuttles or performing feasibility experiments of manned space stations, and the possibility of performing repairs in space, which heretofore were physically difficult, has increased. With conventional methods, however, a large amount of complex tasks, like those mentioned above, is required in repairing a solar panel, and thus for all practical purposes performing repairs in space was impossible.

SUMMARY OF THE INVENTION

In light of these circumstances, it is an object of the invention to provide a solar panel for use in space and a method for manufacturing the same, with which the solar panel for use in space can be manufactured easily and in short time, and replacement or repair work on solar cells can be performed easier and less expensively in time.

The invention provides a solar panel for use in space comprising a plurality of unit solar cell modules including a plurality of solar cells and connection wires for connecting the solar cells, wherein an entirety of the solar panel for use in space is configured by linking the plurality of unit solar cell modules and the linking of the unit solar cell modules electrically connects the unit solar cell modules to one another.

According to the invention, unit solar cell modules including a plurality of solar cells can be combined to form a solar panel for use in space. Consequently, it is possible to easily form solar panels with different power generation properties or shapes by changing the combination of the unit solar cell modules. The manufacture of standardized unit solar cell modules can be automated for mass production, and thus the manufacture of the solar panels can be performed easily and in shorter time.

The unit solar cell modules are provided with electrical wiring, and by mechanically linking the unit solar cell modules to one another they can also be connected electrically. Therefore, a process step for electrically connecting the unit solar cell modules is not necessary, and thus work in the assembly and repair of solar panels can be shortened to reduce overall work time.

In accordance with the invention, solar panels with different power generation capabilities and sizes can be easily fabricated by combining standardized unit solar cell modules to configure the solar panels. Furthermore, using the same standardized unit solar cell modules in a variety of different solar panels makes it possible to mass produce the unit solar cell modules in automated production lines.

Because the unit solar cell modules can be electrically connected by mechanically linking them to one another, the number of steps required to assemble the solar panels is reduced, which in turn reduces task-related mistakes, and therefore highly reliable solar panels for use in space can be manufactured efficiently.

In the invention it is preferable that the unit solar cell modules are linked by detachable means.

According to this aspect of the invention, the unit solar cell modules are detachably attached to the solar panels. Consequently, it is possible to easily remove only damaged unit solar cell modules, for example, and repairs or adjustments with respect to the solar panels can be performed without difficulty.

With this aspect of the invention, when the solar cells are damaged, it is possible to easily remove and replace only the damaged unit solar cell module, and thus the degree of difficulty of repair work on solar panels in space, for example, can be reduced. Also, work efficiency can be improved when repairing the solar panels during manufacture or thereafter.

In the invention it is preferable that a bypass diode for protecting the solar cells with respect to a reverse bias is installed in the unit solar cell modules.

According to this aspect of the invention, the unit solar cell modules have a bypass diode. Consequently, when solar cells are hidden by the shadow of the satellite body and can no longer generate power, or when solar cells are unable to generate power due to damage and/or dirtiness of the cells themselves, the electrical current flows through the diode and bypasses these cells, and thus damage to the solar panel resulting from solar cells with lowered power generating capabilities can be suppressed to a minimum.

With this aspect of the invention, providing bypass diodes in the unit solar cell modules can prevent damage to the solar cells caused by a reverse bias. The damage of broken solar cells can also be minimized. Therefore, unit solar cell module reliability can be improved, and the unit solar cell modules can be used in places such as space, where replacement or repairs are difficult to perform.

In the invention it is preferable that the unit solar cell modules have a support plate with a honeycomb structure of which principal material is aluminum, and that the solar cells are fastened to this support plate.

According to this aspect of the invention, the unit solar cell modules have a support plate, and by fastening the solar cells to the support plate, the strength of the unit solar cell modules can be improved. Moreover, the support plate has a honeycomb structure and is made of aluminum, and thus the unit solar cell modules can be kept lightweight yet sufficiently strong.

With this aspect of the invention, the solar cells are fastened to the support plate, thereby improving the rigidity of the unit solar cell modules. Consequently, there is a reduced risk that the solar panels will be damaged by the acceleration and vibration that occur during transport into space. The support plate is made of aluminum material that has a honeycomb structure, and thus the unit solar cell modules can be kept lightweight yet sufficiently strong.

In the invention it is preferable that the entire of the solar panel is configured by fitting the unit solar cell modules into accommodating spaces for accommodating the unit solar cell modules which are provided in a frame body.

According to this aspect of the invention, the unit solar cell modules are fitted into the accommodating spaces of the frame body, thereby fastening them to the frame body and inhibiting vibration as well as improving the rigidity of the entirety of the solar panel. The unit solar cell modules can be easily positioned, and thus the solar panels can be easily assembled without making a mistake regarding the arrangement position for the unit solar cell modules.

With this aspect of the invention, the unit solar cell modules are prevented from vibrating because they are fitted into the frame body, and thus the rigidity of the entirety of the solar panel is improved. Consequently, there is a reduced risk that the solar panels will be damaged by vibration and acceleration during the transport into space. Furthermore, because the unit solar cell modules are fitted into the frame body, the task of positioning the unit solar cell modules is easy, and thus the solar panels can be assembled with ease.

In the invention it is preferable that the entirety of the solar panel is configured by arranging and linking together the unit solar cell modules on a substrate on which the arrangement positions for the unit solar cell modules are indicated.

According to this aspect of the invention, because the unit solar cell modules are connected to the arrangement positions on the substrate, the time required for positioning them is shortened. Also, the easily damaged solar cells are reinforced by the substrate, and thus the solar cells can be further prevented from breaking.

With this aspect of the invention, the unit solar cell modules are connected to the arrangement positions on the substrate, and thus the unit solar cell modules are reinforced by the substrate, and the solar cells can be prevented from being damaged.

In the invention it is preferable that the unit solar cell modules have a structure with which they can be mechanically linked to one another, and that the entirety of the solar panel is configured by mechanically linking the unit solar cell modules to one another.

According to this aspect of the invention, a solar panel can be easily assembled by mechanically linking a plurality of unit solar cell modules to one another, and the unit solar cell modules can be more reliably linked to one another.

In the invention it is preferable that the unit solar cell modules have a structure with which they can be mechanically linked to one another, and that an entirety of the panel is configured by fitting a plurality of mutually linked unit solar cell modules into a frame body provided with accommodating spaces for accommodating a plurality of mutually linked unit solar cell modules.

According to this aspect of the invention, a plurality of mutually linked unit solar cell modules are fitted into the accommodating spaces of the frame body, thereby fastening the unit solar cell modules to the frame body and improving the rigidity of the entirety of the solar panel.

In the invention it is preferable that the mechanical structure linking the unit solar cell modules to one another includes a protruding portion provided on one side of each of the unit solar cell modules and a recessed portion provided on another side of each of the unit solar cell modules.

According to this aspect of the invention, the protruding portion of one unit solar cell module can be interlocked with the recessed portion of another unit solar cell module to easily join and link up any number of unit solar cell modules. Moreover, because the protruding portions and the recessed portions interlock, there is no risk of linking the unit solar cell modules together facing in the wrong direction.

With this aspect of the invention, by providing a protruding portion on one side and a recessed portion on the other side of each of the unit solar cell modules, a plurality of unit solar cell modules can be mechanically linked to each other. Consequently, there is no risk of linking the unit solar cell modules together facing in the wrong direction, and they can be linked together with ease in places such as space where it is difficult to perform complex tasks.

In the invention it is preferable that the frame body includes ground conduction paths for electrically connecting a light receiving side surface of each of the unit solar cell modules to a spacecraft ground.

According to this aspect of the invention, the light receiving side surface of each of the unit solar cell modules can be kept from being charged due to cosmic rays by connecting the light receiving side surface of the unit solar cell modules with the ground conduction paths to a ground.

With this aspect of the invention, the surfaces of the solar panels can be prevented from being charged by connecting the light receiving surface side of the unit solar cell-modules to a ground.

In the invention it is preferable that a plurality of unit solar cell modules interconnected is lined with a resin film.

According to this aspect of the invention, lining the unit solar cell modules with a resin film improves the strength of the solar panels while keeping them lightweight.

With this aspect of the invention, by lining the unit solar cellmodules with a resin film, it is possible to improve the strength of the solar panels while keeping them lightweight.

In the invention it is preferable that the unit solar cell modules are provided with condenser lenses for gathering light into the solar cells.

According to this aspect of the invention, the solar cells can receive the light gathered by the condenser lenses, and thus can more effectively convert light energy into electrical energy. Consequently, the area of the solar cells can be kept smaller than the light receiving area of the solar panel itself. Thus, the solar panels can be made small and lightweight, and the number of expensive semiconductor cells that are used can be kept low.

The arrangement of the condenser lenses and the solar cells is adjusted in the unit solar cell modules, and therefore when the solar panels are assembled, it is not necessary to once again adjust the positions of condenser lenses and the solar cells.

Furthermore, with this aspect of the invention, the condenser lenses can focus solar light, and thus it is possible to reduce the size of the solar cells, keep down the used amount of semiconductors, and lower costs. The unit solar cell modules have a set arrangement of condenser lenses, so when assembling the solar panel, it is not necessary to adjust the positions of the condenser lenses and the solar cells, and thus the solar panel can be easily assembled.

In the invention it is preferable that the unit solar cell modules are provided with a frame for supporting the condenser lenses, the solar cells, and the connection wires.

According to this aspect of the invention, the frame holds the condenser lenses with sufficient strength and the solar panels can be made lightweight.

With this aspect of the invention, the frame can hold the condenser lenses with sufficient strength.

In the invention it is preferable that the condenser lenses have a plurality of non-consecutive focal points with respect to a single lens plate, and that the solar cells are arranged at positions corresponding to those focal points.

According to this aspect of the invention, the condenser lenses have a plurality of focal points, so it is not necessary to provide a condenser lens for each solar cell that is disposed in a unit solar cell module, and when there are for example nine solar cells disposed in a unit solar cell module, it is sufficient to attaching only one lens plate having nine focal points, thus making it is possible to reduce the number of components in the unit solar cell modules compared to the case in which nine lens plates each with a single focal point are attached.

With this aspect of the invention, the condenser lenses have a plurality of focal points, so it is not necessary to provide a condenser lens for each solar cell that is disposed in a unit solar cell module, and thus the number of components in the unit solar cell modules can be reduced. Therefore, the unit solar cell modules can be fabricated more easily.

In the invention it is preferable that the connection wires and a bypass diode for protecting the solar cells with respect to a reverse bias are disposed in regions which are not irradiated with light gathered by the condenser lenses.

According to this aspect of the invention, the connection wires and the bypass diode are provided in regions which are not irradiated with light, and thus they do not deteriorate due to light, and their lifetime can be prolonged.

With this aspect of the invention, the connection wires and the bypass diode are provided in regions where light is not gathered, and thus they do not deteriorate due to the light, and their lifetime can be prolonged. Therefore, the reliability of the solar panel increases, and it can be used in places like space where it is difficult to perform replacement or repair work.

In the invention it is preferable that a surface of the condenser lenses is coated with a light transmitting, conductive thin film that is connected to a spacecraft ground.

According to this aspect of the invention, the conductive thin film can suppress a charging of the surface of the condenser lenses due to cosmic rays.

With this aspect of the invention, because the conductive thin film is connected to a ground, the surface of the solar panel can be kept from becoming charged, and thus problems due to such charging can be prevented.

In accordance with the invention, a method for manufacturing a solar panel for space use includes:

configuring an entirety of the solar panel for use in space by detachably linking a plurality of unit solar cell modules, which include a plurality of solar cells and connection wires for connecting the solar cells, connecting the unit solar cell modules to one another, and repairing or adjusting the solar panel by removing and exchanging a portion of the linked unit solar cell modules.

According to this aspect of the invention, the unit solar cell modules are detachably linked to a solar panel, so by removing and replacing unit solar cell modules including broken solar cells, repair work on the solar panel can be simplified and work time can be reduced.

Because the unit solar cell modules are detachably linked to a solar panel, maintenance on the solar panel can be performed by removing and replacing unit solar cell modules including broken solar cells.

Thus, work such as repairs or maintenance resulting from the replacement of solar cells can be easily carried out with less amount of work than conventionally, and can be suitably adapted to maintenance performed in space, which has conventionally been considered difficult.

BRIEF DESCRIPTION OF THE DRAWINGS

Other and further objects, features, and advantages of the invention will be more explicit from the following detailed description taken with reference to the drawings wherein:

FIGS. 1A and 1B are views showing the solar panel 20 according to an embodiment of the invention;

FIGS. 10A and 10B are views showing a unit solar cell module 21 with the cover glass sheet 33a;

FIG. 12 is a cross sectional view of the frame body 26 in FIG. 11B taken along the section line C—C;

FIG. 21 is a perspective view showing the unit solar cell modules 21a;

FIG. 26 is a perspective view showing the condenser-type unit solar cell module 30a;

DETAILED DESCRIPTION OF THE PREFERRED EMBODIMENTS

Figure 2A:
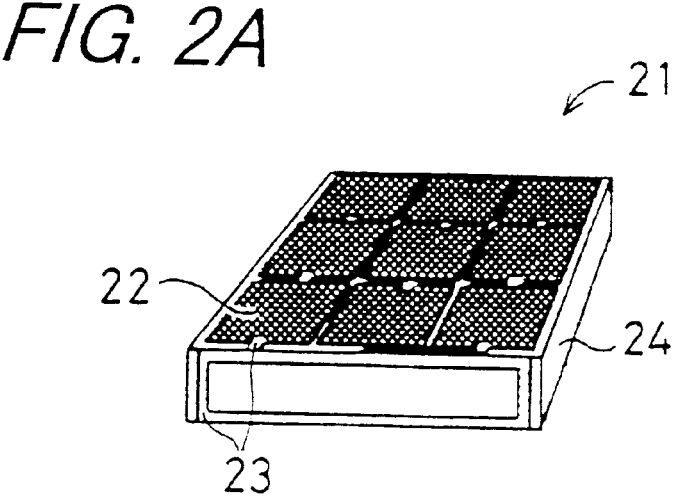
FIGS. 2A and 2B are perspective views showing a unit solar cell module 21.

Now referring to the drawings, preferred embodiments of the invention are described below.

FIG. 1A is a perspective view showing an entirety of the solar panel 20 according to the present embodiment. The solar panel 20 is configured by linking together a plurality of unit solar cell modules 21. As shown in FIG. 1B, the unit solar cell modules 21 taken out from the solar panel 20 are produced as individual units standardized to the same shape and the same configuration. A certain solar panel 20 can be fabricated by combining a plurality of these units of unit solar cell modules 21.

FIG. 2A is a perspective view showing a unit solar cell module 21. The unit solar cell module 21 includes a plurality of connection wires 23 for connecting a plurality of solar cells 22, and a support plate 24 for fastening the solar cells 22.

The solar cells 22 are oblong and made of crystalline silicon, for example, and are fastened to the support plate 24. Electrodes formed on the solar cells 22 are connected to other solar cells by the connection wires 23. The support plate 24 has a honeycomb structure of which principal material is aluminum, and thus the unit solar cell modules 21 are lightweight and highly rigid. The aluminum honeycomb support plate 24 is of material that has a proven track record as substrate material for the solar panel 20, and even when fabricated to the size of the relatively small unit solar cell modules 21, its low weight and strength are suited for space. A cover glass sheets (not shown) is provided on the surface of the light receiving side of the solar cells 22.

The unit solar cell modules 21 are units with a modular structure in which two or more solar cells 22 are fastened to the support plate 24 via the connection wires 23. For example, as shown in FIG. 2A, the unit solar cell modules 21 are configured by arranging and wiring together a total of nine solar cells 22, that is, three cells by three cells, each approximately 3 cm×3 cm in size, and attaching those solar cells 22 to the approximately 2.5 cm thick support plate such that the unit solar cell modules 21 have a light receiving side area of approximately 100 cm$^2$ (10 cm×10 cm). Arranging these unit solar cell modules 21 into a combination of 8 cells×10 cells, as shown in FIG. 1A, an 80 cm×1 m solar panel for space can be assembled.

Figure 2B:
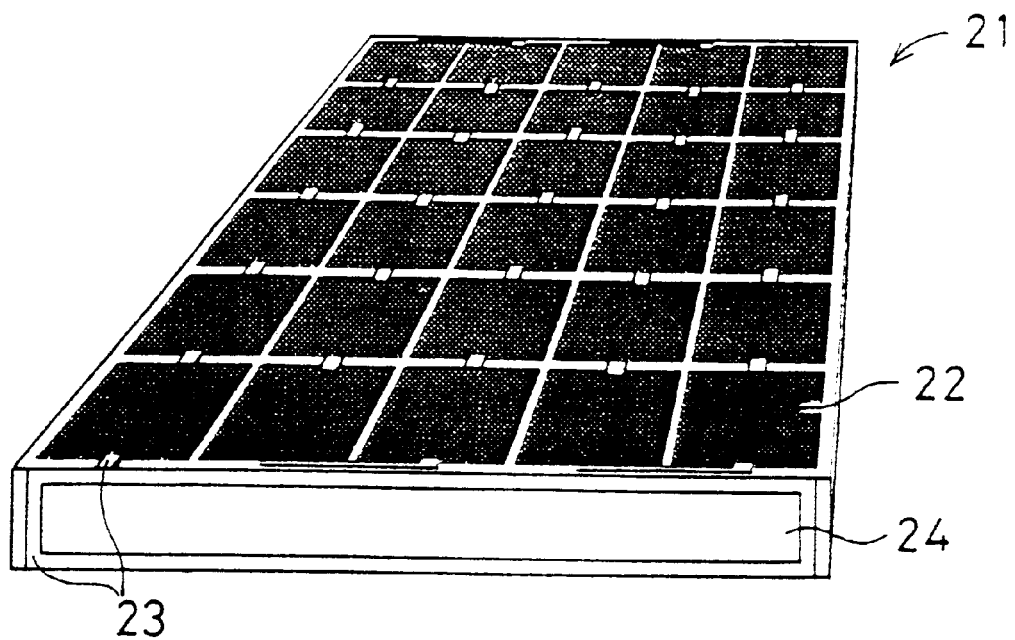

FIG. 2B are views showing a unit solar cell module 21 in which a total of thirty solar cells 22, that is, 6 cells×5 cells, have been arranged. Thus, the unit solar cell modules 21 can be designed to various shapes and power generation capabilities by altering the size of the support plate 24 and the number of solar cells 22.

The unit solar cell modules 21 have a smaller number of solar cells than the number of solar cells 22 mounted to the entirety of the solar panel 20, so relatively complicated tasks are not necessary in fabricating the unit solar cell modules 21 themselves. Furthermore, if the solar panels 20 are made by combining standardized unit solar cell modules 21, then a variety of solar panels 20 can be manufactured by combining a number of identical or similarly shaped unit solar cell modules 21 in various ways.

As mentioned above, the unit solar cell modules 21 can be manufactured by mass production with an automated line, thus contributing to the simplification of the manufacture of the solar panels 20.

Due to the introduction of these unit solar cell modules 21, the conventional task of welding or soldering each individual solar cell 22 has turned into the task of simply attaching the unit solar cell modules 21 to the solar panels 20, and from the reduction in tasks due to the decrease in the number of steps in assembling the solar panels 20, there are less work-related mistakes, and the solar panels 20 for space, which must be highly reliable, can be efficiently manufactured.

When repairing the solar panels 20 after damage to the solar cells 22, it is possible to complete the repair work by simply replacing the unit solar cellmodules 21. Moreover, because a group of several solar cells 22 is treated as one unit, it is possible to control the number and area of the attaching portions for fastening the unit solar cell modules 21 and the total increase in weight, maintaining the strength and capabilities of the solar panels for use in space, such as in artificial satellites, while improving workability and productivity.

Figure 3:
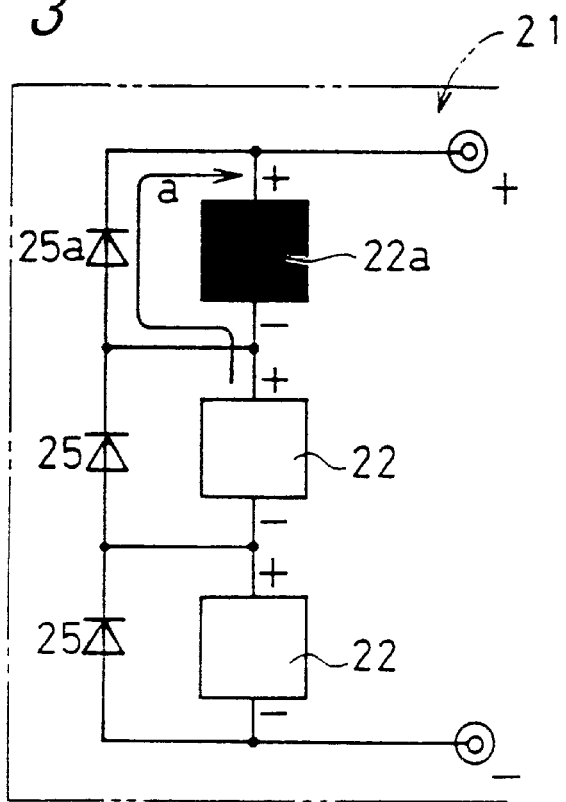
FIG. 3 is an example of a circuit diagram showing a portion of a unit solar cell module 21.

Protection diodes 25 (bypass diode) for protecting the solar cells 22 with respect to a reverse bias (not shown in FIGS. 2A, 2B) are mounted on the unit solar cell modules 21. FIG. 3 is an example of a circuit diagram showing a portion of the unit solar cell modules 21. In the case of FIG. 3, the protection diodes 25 are provided in parallel to the solar cells 22. The protection diodes 25 are attached to the solar cells 22 such that they bypass the path of the current when a large reverse voltage is applied to the solar cells 22.

As shown in FIG. 3, when the power generating capabilities of a single solar cell 22a in the unit solar cell module 21 drops due to the satellite's shadow, for example, the current bypasses this solar cell 22a and flows through the protection diode 25a provided in parallel to the solar cell 22a (flows in the "a" direction in FIG. 3). Therefore, the protection diode 25a is able to protect the solar cell 22a from a reverse bias.

By mounting the protection diodes 25 on the unit solar cell modules 21, it becomes unnecessary to perform the series of tasks for connecting and attaching protection diodes to the solar cells on the solar panels 20, as has been the case with conventional methods for manufacturing solar panels, and without performing any new or special tasks, the unit solar cell modules 21 can be easily provided with the function of preventing that a reverse bias is applied to the solar cells 22 and destroys the solar cells 22.

Figure 4:
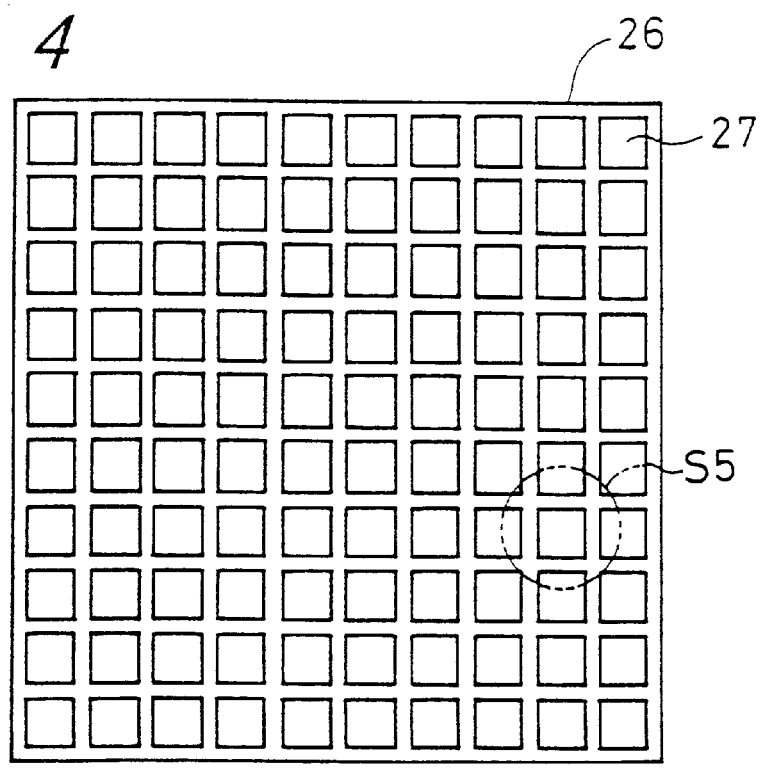
FIG. 4 is a front view showing the frame body 26.

FIG. 4 is a front view showing an entire frame body 26. The solar panels 20 include the frame body 26, which is provided with accommodating spaces 27 for accommodating the unit solar cell modules 21. The unit solar cell modules 21 are fitted into the accommodating spaces 27 of the frame body 26, thus forming the solar panels 20. The frame body 26 is made of metal, or of a plastic such as CFRP (Carbon Fiber Reinforced Plastic).

Figure 5A:
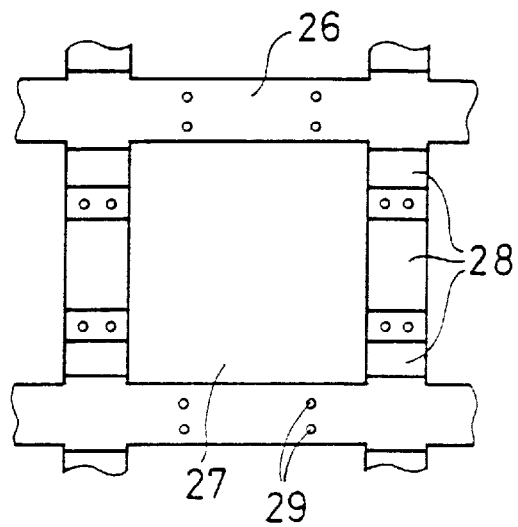
FIGS. 5A and 5B are enlarged front views of section S5 of the frame body 26 in FIG. 4.
Figure 5B:
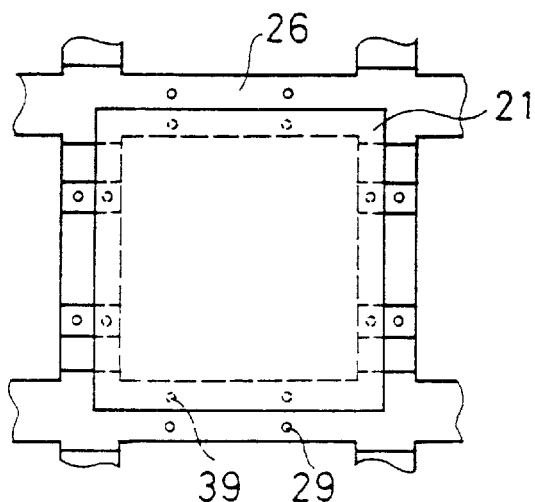

FIGS. 5A and 5B are enlarged front views of section S5 of the frame body 26 of FIG. 4. FIG. 5A is a view showing the frame body 26, and FIG. 5B is a view showing the frame body 26 and a single unit solar cell module 21 attached to the frame body 26. As shown in FIG. 5A, the frame body 26 is provided with the accommodating spaces 27, and is formed into a lattice, for example. It is preferable that connecting conductor paths 28 for electrically linking the unit solar cell modules 21 are formed in the frame body 26. Furthermore, screw holes 29 for fastening the fitted unit solar cell modules 21 are formed in the frame body 26. It is preferable that the screw holes 29 are disposed in regions other than those in which the connecting conductor paths 28 are formed.

It is preferable that a protruding portion corresponding to the accommodating space 27 is formed on the unit solar cell modules 21 so that they can be fitted into the frame body 26, as shown in FIG. 5B. Furthermore, it is preferable that screw holes 39 are formed in the unit solar cell modules 21, arranged at positions opposite the screw holes 29 of the frame body 26 when the unit solar cell modules 21 are fitted into the frame body 26.

Figure 6:
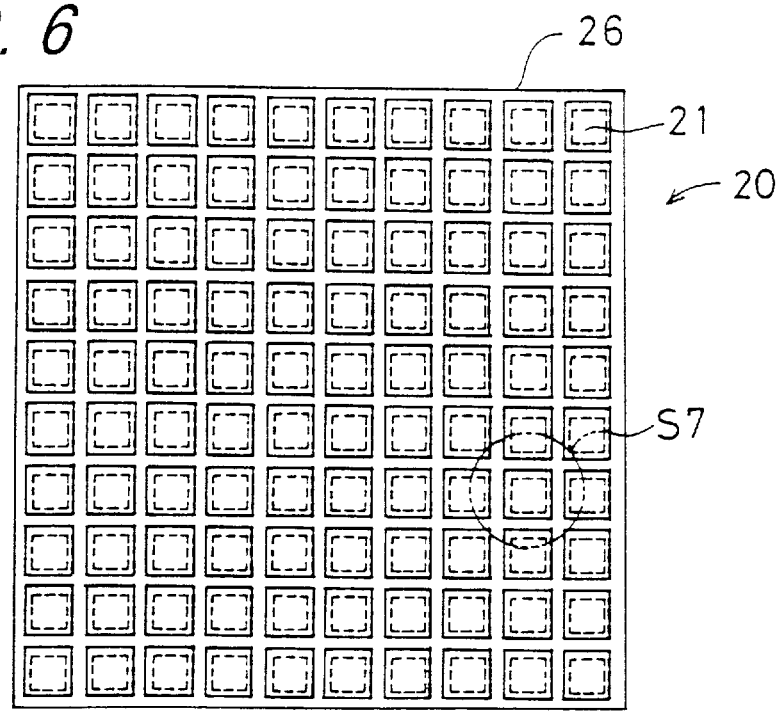
FIG. 6 is a front view showing the front of a solar panel 20 having the frame body 26.
Figure 7:
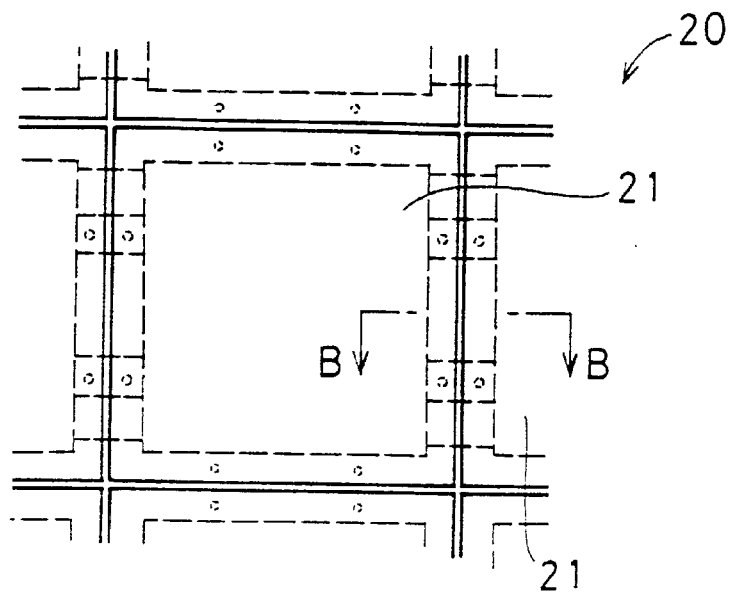
FIG. 7 is an enlarged front view of section S7 of the solar panel in FIG. 6.

FIG. 6 is a front view of an entirety of the solar panel 20 in which the unit solar cell modules 21 have been fitted. FIG. 7 is a front view showing a magnification of section S7 of the solar panel 20 of FIG. 6. As shown in FIG. 6 and FIG. 7, the unit solar cell modules 21 are arranged in a matrix on the solar panel 20, and are electrically linked to one another via the connecting conductor paths 28 provided in the frame body 26.

Figure 8:
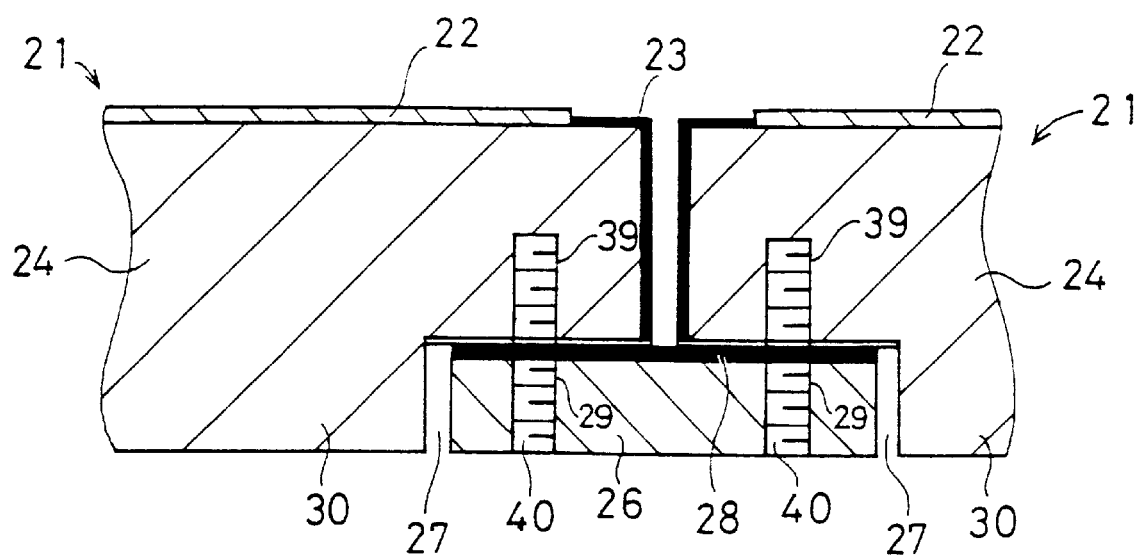
FIG. 8 is a cross sectional view of the solar panel 20 in FIG. 7 taken along the section line B—B.

FIG. 8 is a cross sectional view of the solar panel 20 of FIG. 7 taken along the section line B—B. As shown in FIG. 8, a protruding portion 30 formed on the unit solar cell modules 21 is fitted into the accommodating space 27. Furthermore, when the protruding portion 30 is fitted into the accommodating space 27, a screw member 40 is screwed into the screw holes 29 and 39 of the unit solar cell modules 21 and the frame body 26 so as to fasten the unit solar cell modules 21. Moreover, the unit solar cell modules 21 can be detached from the frame body 26 by removing the screw members 40.

By attaching the unit solar cell modules 21 to the frame body 26, the connecting conductor paths 28 of the frame body 26 make contact with and electrically connect to the connection wires 23 of the unit solar cell modules 21.

Figure 9A:
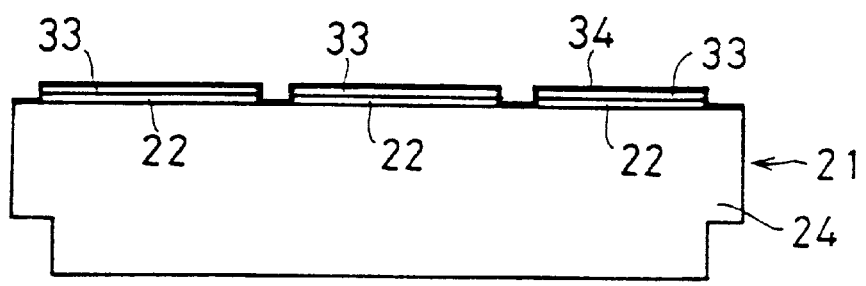
FIGS. 9A and 9B are views showing a unit solar cell module 21 including the cover glass sheets 33.
Figure 9B:
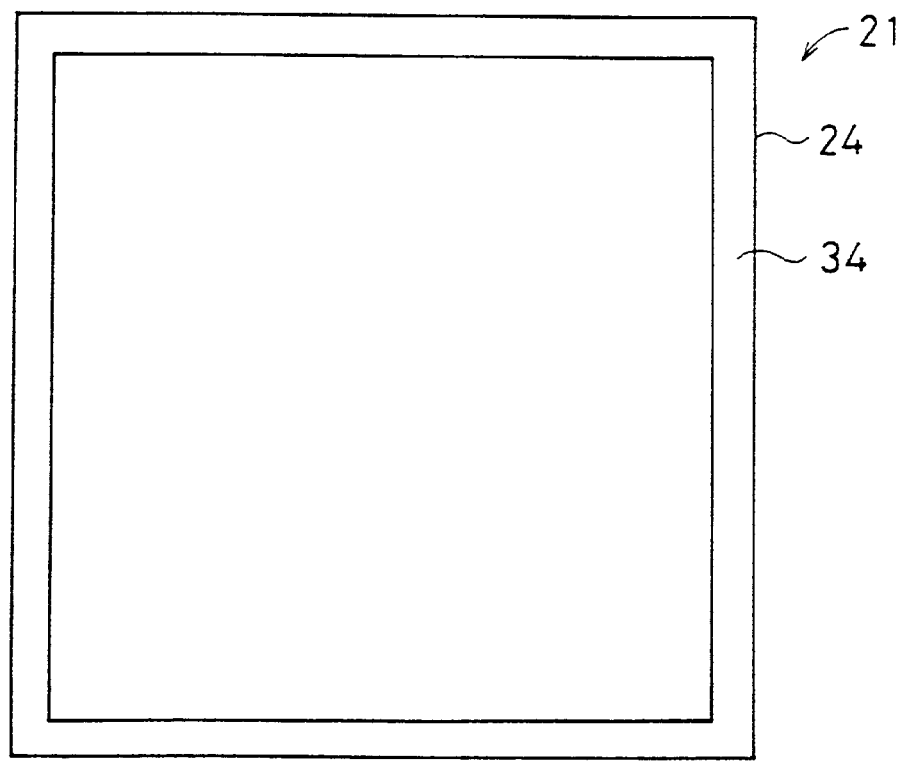

FIG. 9A is a cross sectional view of a unit solar cell module 21 having cover glass sheets 33. FIG. 9B is a front view of FIG. 9A. The cover glass sheets 33 are provided on the unit solar cell modules 21 such that they adhere to the surface of the solar cells 22 on their light receiving side. The cover glass sheets 33 are provided in plurality, and each cover glass sheets 33 is attached to a corresponding solar cell 22. The cover glass sheets 33 are provided to protect the solar cells 22 from low energy cosmic rays, for example. Additionally, a light transmitting conductive layer 34, for example, covers the entire light receiving surface of the cover glass sheets, thereby electrically connecting them.

Figure 10A:
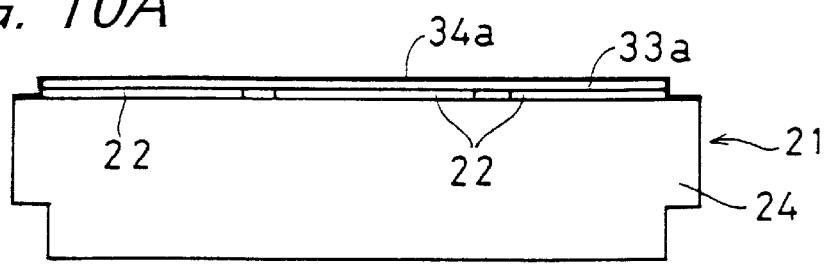
Figure 10B:
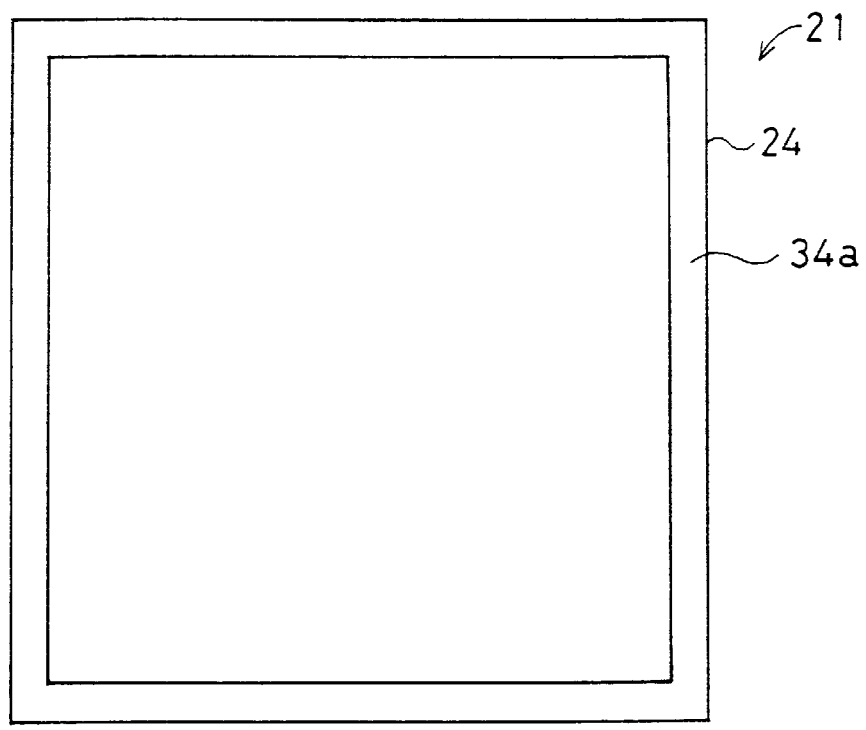

FIG. 10A is a cross sectional view of a unit solar cell module 21 with a cover glass sheet 33a that is different from that of FIG. 9A and FIG. 9B. FIG. 10B is a front view of FIG. 10A. The unit solar cell modules 21 are provided with a single cover glass sheet 33a that adheres to the surface of the solar cells 22 on their light receiving side. The cover glass sheet 33a is provided to protect the solar cells 22 from low energy cosmic rays, for example. Additionally, the surface of the cover glass sheet 33a is coated with a conductive layer 34, for example, which transmits light and conducts electricity.

Figure 11A:
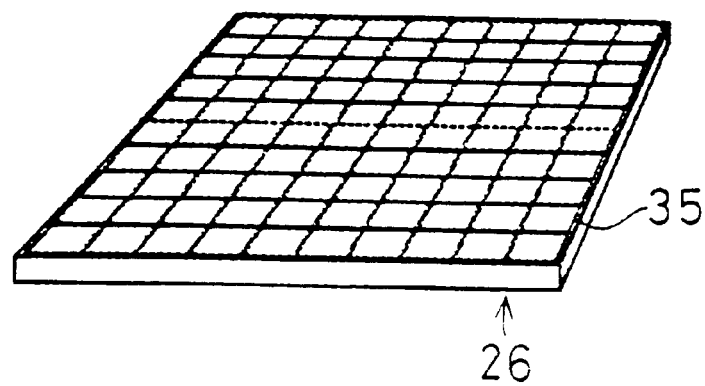
FIGS. 11A and 11B are views showing the frame body 26 on which the support portions 35 are formed.
Figure 11B:
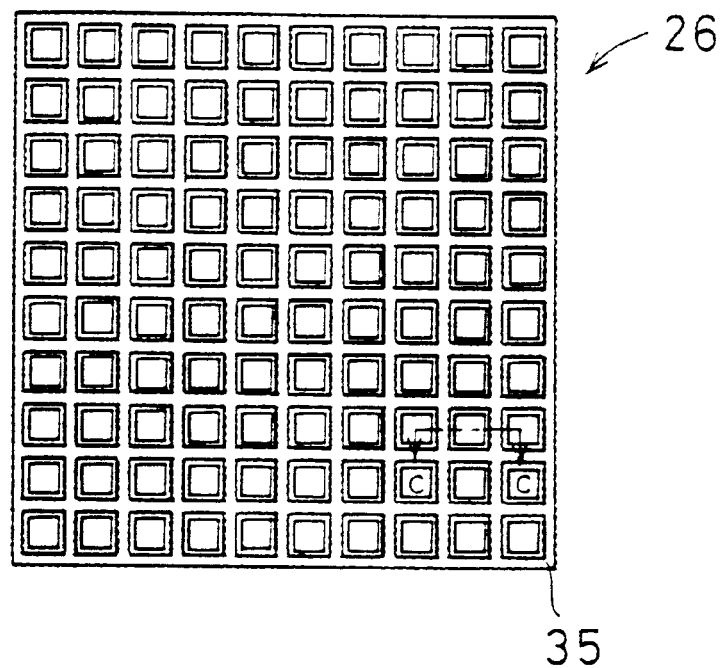

FIGS. 11A and 11B are views showing the frame body 26 provided with support portions 35. FIG. 12 is a cross sectional view of the frame body 26 taken along the section line C—C of FIG. 11B. The frame body 26 is provided with support portions 35 at regions that come into contact with the lateral four faces of unit solar cell modules 21 when the unit solar cell modules 21 are fitted into the frame 26. The support portions 35 are provided with ground conduction paths 41, which are made of conductive material and are for connecting the regions including the sides that are in contact with the surface of the light receiving side of the unit solar cell modules 21 to the satellite ground of the spacecraft.

Figure 13:
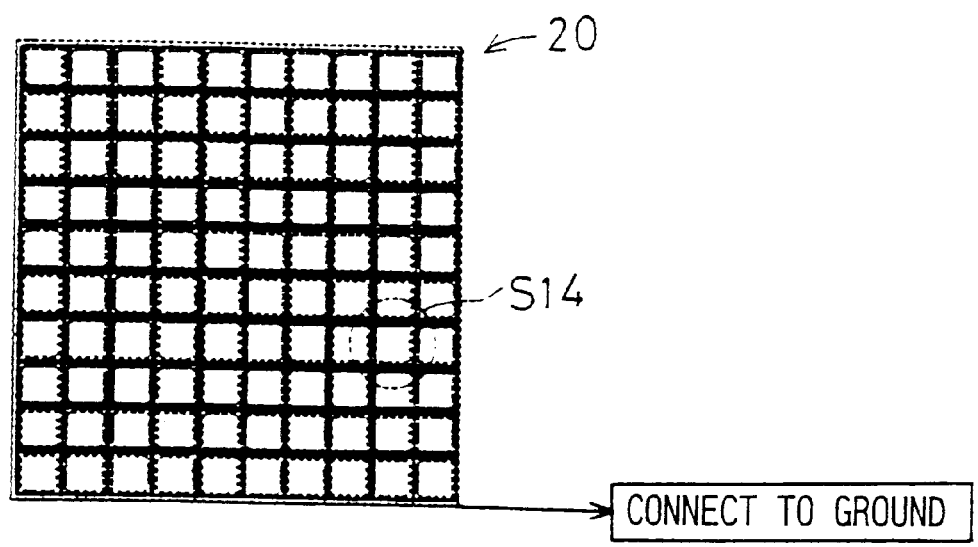
FIG. 13 is a front view showing the solar panel 20 including the frame body 26.
Figure 14A:
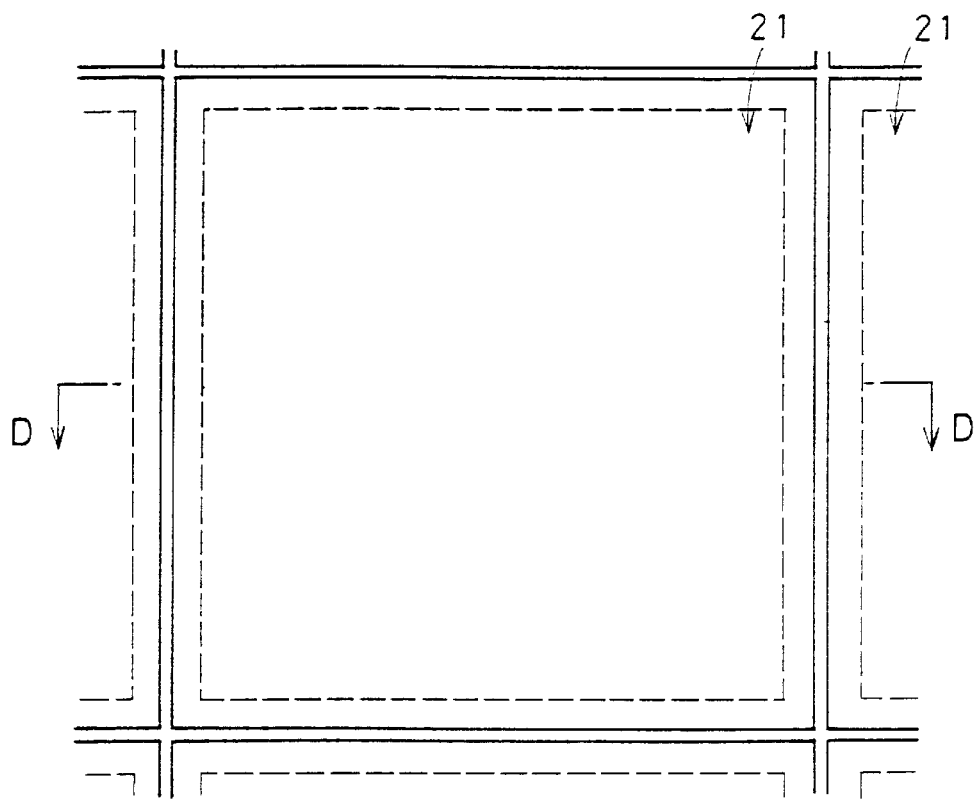
FIG. 14A and FIG. 14B are enlarged views showing the solar panel 20 of FIG. 13.
Figure 14B:
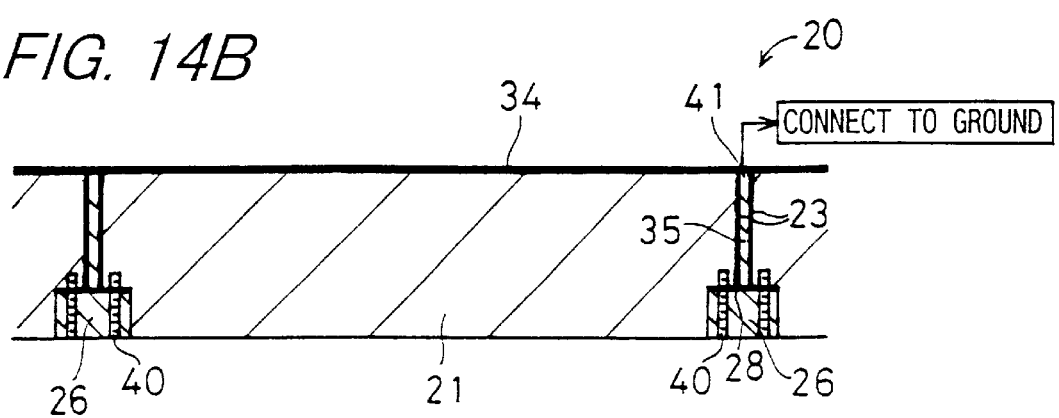

FIG. 13 is a front view showing an entirety of the solar panel 20 that has been configured using the frame body 26. FIG. 14A is an enlarged view of section S14 of FIG. 13, and FIG. 14B is a cross sectional view of FIG. 14A taken along the section line D—D. In the assembled solar panel 20, by connecting the ground conduction paths 41 of the support portions 35 to the electrical ground, the surface of the light receiving side of the unit solar cell modules 21 can be lowered to the ground of the space craft, and the surface of the cover glass sheets 33, which protects the surface of the solar cells 22, can be prevented from being electrically charged by the flyby of charged particles, for example. With this method, it is possible to omit the task of attaching wiring for making a ground connection, to the surface of each solar cell 22 after the solar cells 22 have been made into a solar panel.

The plurality of interconnected unit solar cell modules 21 is lined with a resin film to raise the physical strength of the solar panel 20. Although the structure of the solar panel 20 for space using the frame body 26 and the unit solar cell modules 21 may have weaker panels than conventional solar panels, this problem is resolved by using an easily removable lightweight organic resin film, for example, as a reinforcing film.

Figure 15:
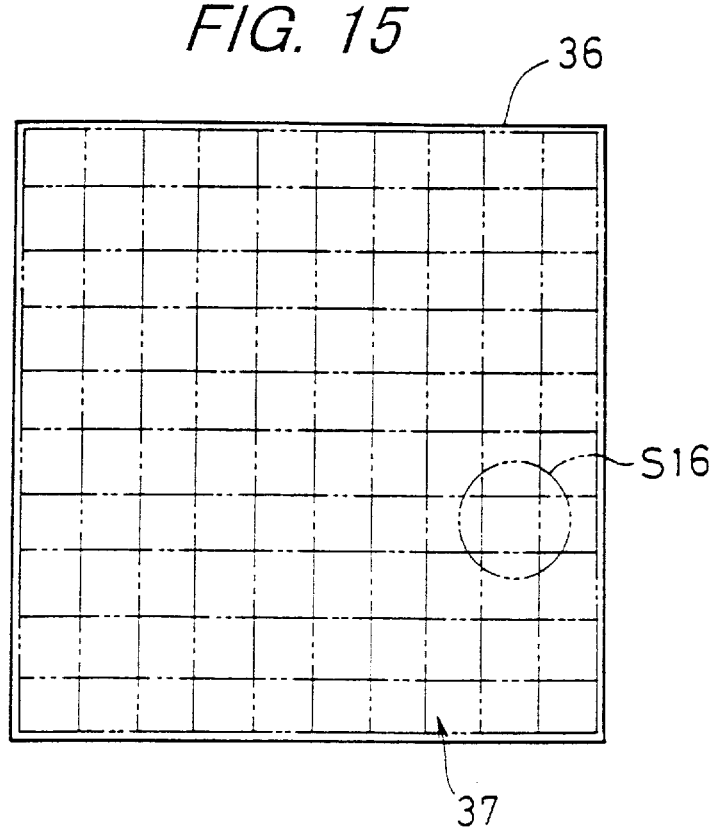
FIG. 15 is a front view showing the substrate 36.

As an embodiment of another solar panel 20a in which the unit solar cell modules 21 are linked, it is also possible to use a substrate 36 instead of the frame body 26, as shown in FIG. 15. The substrate 36 is made of metal or a plastic such as CFRP. This embodiment using the substrate 36 is similar to the aforementioned embodiment, and similar components will be given identical reference numerals and omitted from the explanation.

As shown in FIG. 15, the solar panel 20a includes the substrate 36 on which the unit solar cell modules 21 can be placed and linked at arrangement positions 37 (the regions in FIG. 15 surrounded by the double-dashed line), and the entirety of the solar panel is configured by arranging the unit solar cell modules 21 on the substrate 36.

Figure 16A:
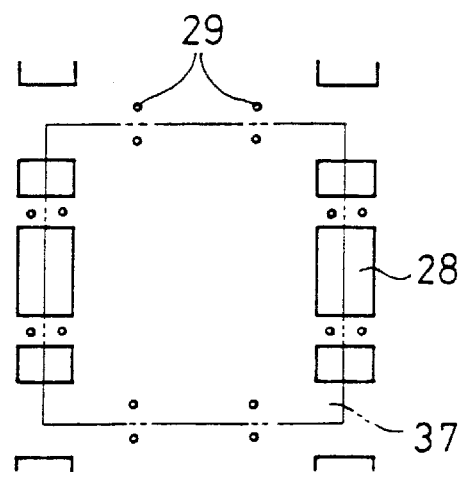
FIGS. 16A and 16B are enlarged views of section S16 of the substrate 36 of FIG. 15.
Figure 16B:
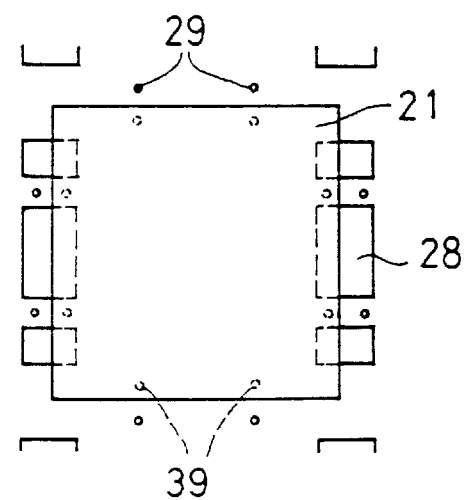

FIGS. 16A and 16B are enlarged views of section S16 of the substrate 36 in FIG. 15. As shown in FIG. 16A, screw holes 29 for lining up the unit solar cell modules 21 are bored in the substrate 36, and connecting conductor paths 28 for electrically connecting the unit solar cell modules 21 are provided on the surface of the substrate 36 where it comes into contact with the unit solar cell modules 21.

FIG. 16B is a front view showing a single unit solar cell module 21 arranged on the substrate 36. Screw holes 39 are formed in the unit solar cell module 21 such that they are opposite the screw holes 29 of the substrate 36 when the unit solar cell module 21 is arranged at the arrangement position 37 on the substrate 36. The unit solar cell module 21 is arranged at a predetermined arrangement position 37.

Figure 17:
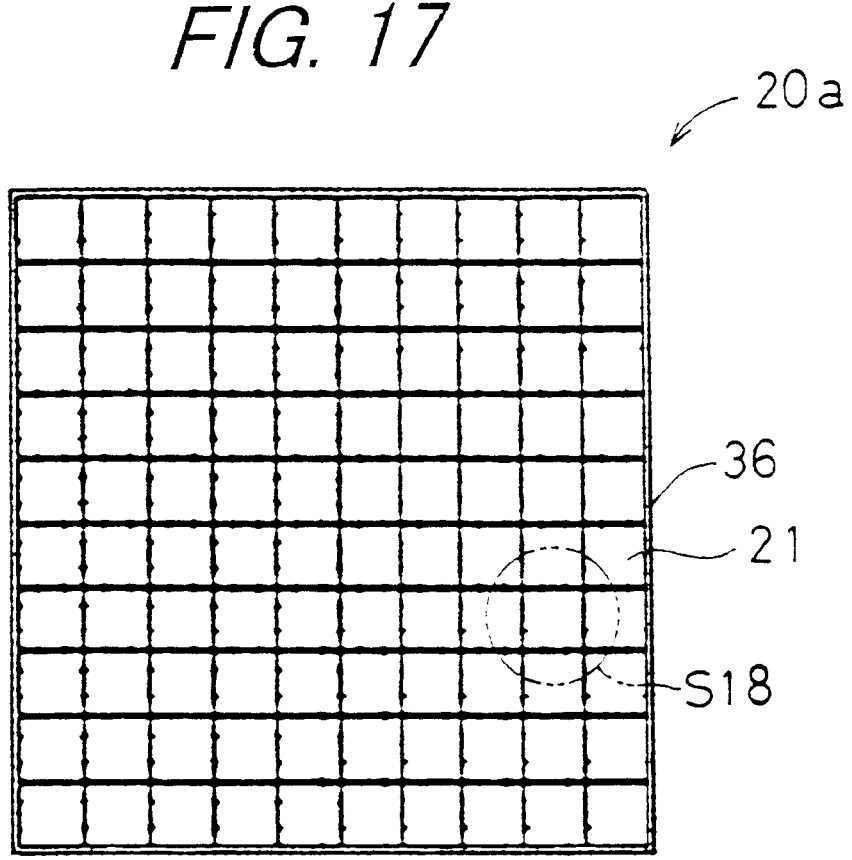
FIG. 17 is a front view showing a solar panel 20a in which the substrate 36 is used.
Figure 18:
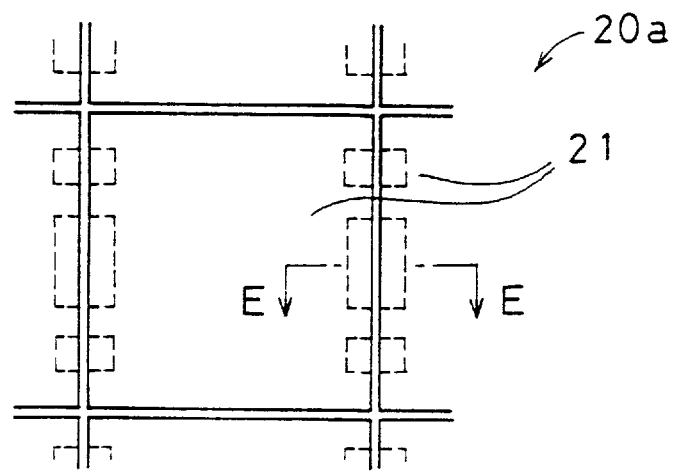
FIG. 18 is an enlarged view of section S18 of the solar panel 20a of FIG. 17.

FIG. 17 is a front view showing the entirety of the solar panel 20a, onto which the unit solar cell modules 21 have been arranged. FIG. 18 is an enlarged view of section S18 of the solar panel 20a of FIG. 17. As shown in FIG. 17 and FIG. 18, in the solar panel 20a, the unit solar cell modules 21 are arranged in a matrix and electrically linked to one another via the connecting conductor paths 28 provided on the substrate 36.

Figure 19:
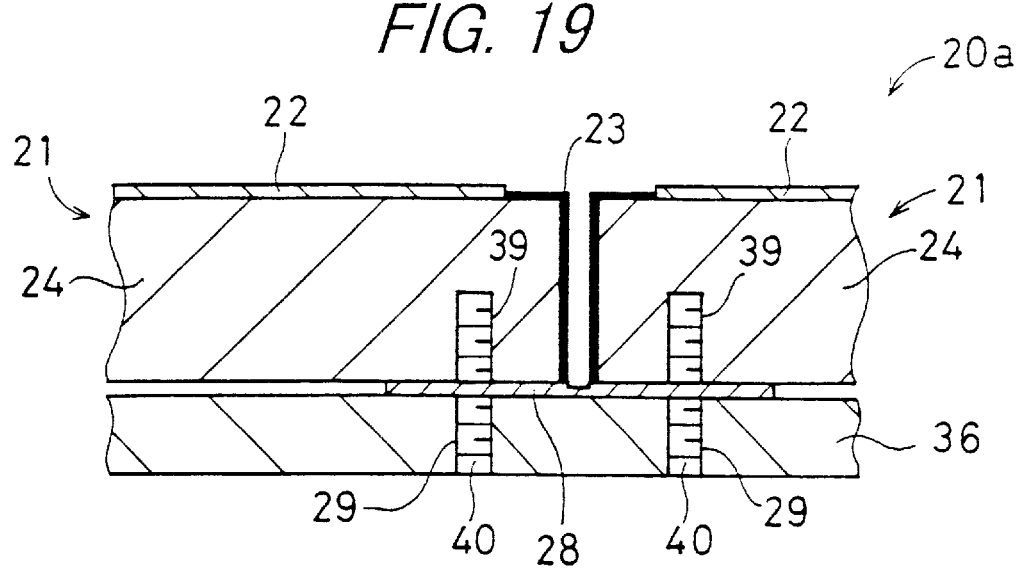
FIG. 19 is a cross sectional view of the solar panel 20a of FIG. 18 taken along the section line E—E.

FIG. 19 is a cross sectional view of the solar panel 20a taken along the section line E—E in FIG. 18. As shown in FIG. 18, the unit solar cell modules 21 are arranged in rows on the substrate 36. As with the previously mentioned frame body 26, the unit solar cell modules 21 can be detachably fastened to the substrate 36 using the screw members 40.

Figure 20:
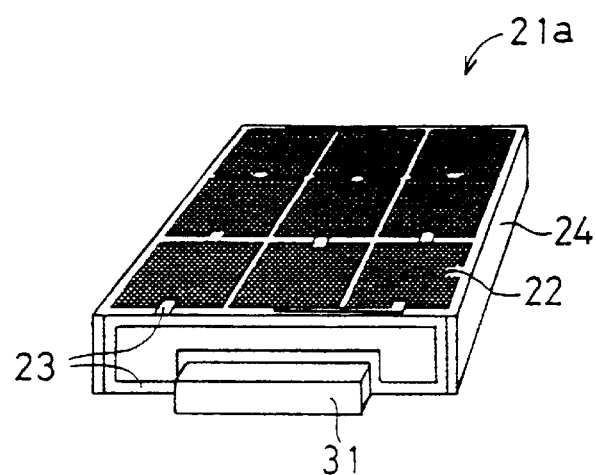
FIG. 20 is a perspective view showing a unit solar cell module 21a according to a further embodiment of the invention.
Figure 21:
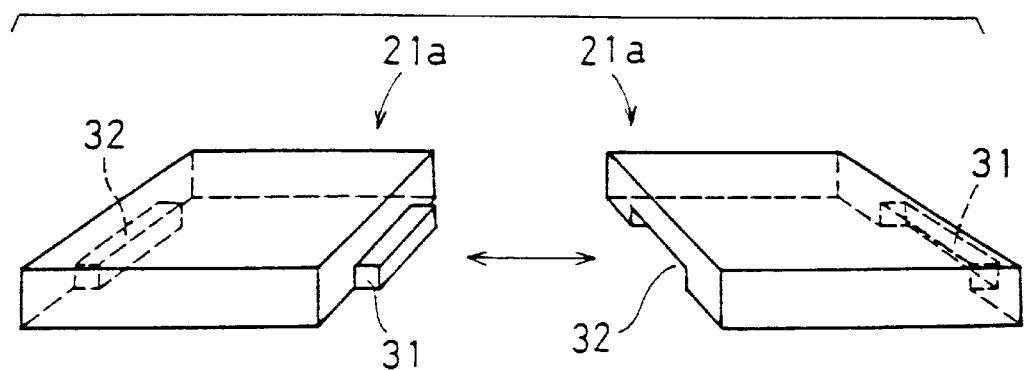

FIG. 20 and FIG. 21 are perspective views showing a unit solar cell module 21a according to a further embodiment. Regarding the unit solar cell modules 21a according to this further embodiment, structural components that are similar to those previously mentioned will be given identical reference numerals and omitted from the following description.

The unit solar cell modules 21a are structured so that they can be mechanically linked to one another, and the entirety of the solar panel is configured by mechanically linking the unit solar cell modules 21a. More specifically, the unit solar cell modules 21a are provided with a protruding portion 31 on one side, and are provided with a recessed portion 32 on the opposite side.

As shown in FIG. 21, the protruding portion 31 and the recessed portion 32 of the unit solar cell modules 21a can be joined together, and by linking a plurality of unit solar cell modules 21a together, the entirety of the solar panel can be easily configured without making a mistake in the orientation of the connection. The unit solar cell modules 21a are given a standardized structure so that electrode polarity and structural regularity can be maintained, and so that when they are assembled into the solar panel, the unit solar cell modules 21a are connected to one another almost entirely in series, that is, plus electrodes are connected only to minus electrodes, and therefore this method is effective in simplifying the manufacture of solar panels.

It is also possible to configure the entire panel by fitting the linked unit solar cell modules 21a into the frame body, which is provided with accommodating spaces for accommodating a plurality of linked unit solar cell modules 21a. Thus, the unit solar cell modules are linked to one another, and are furthermore accommodated within the accommodating spaces, and therefore the unit solar cell modules 21a can be more reliably fastened, and the rigidity of the solar panel can be further improved.

Figure 22A:
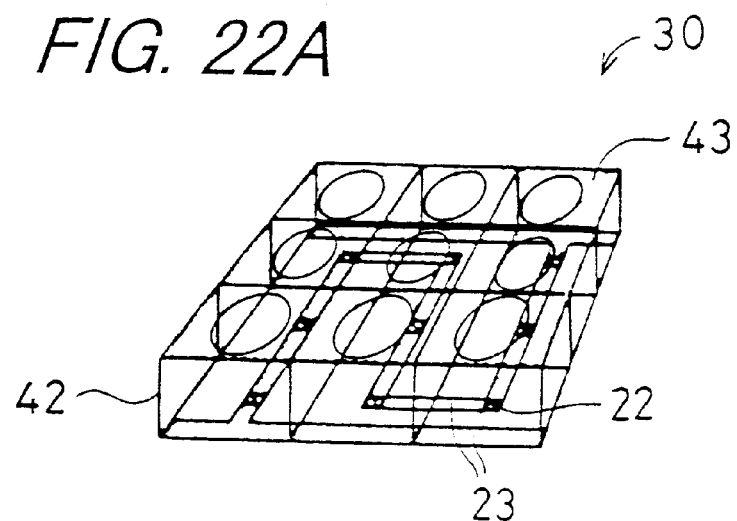
FIG. 22A and FIG. 22B are perspective views showing a condenser-type unit solar cell module 30.
Figure 22B:
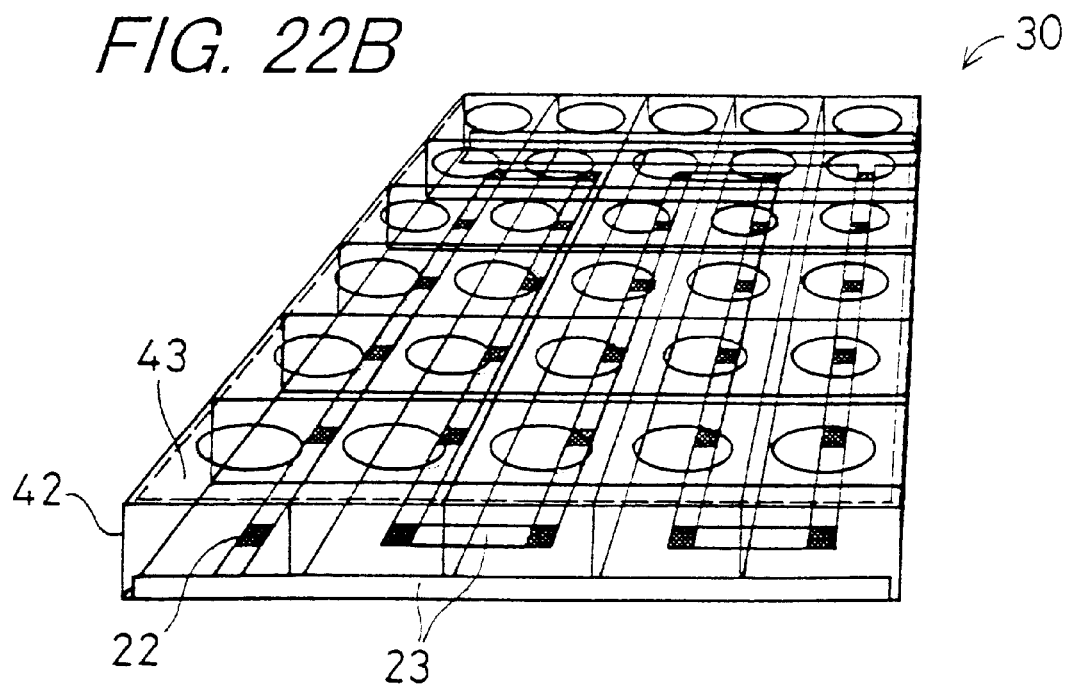

FIG. 22A and FIG. 22B are perspective views of a condenser-type unit solar cell module 30 according to a further embodiment using condenser lenses 43 for gathering light into the solar cells instead of the aforementioned unit solar cell modules 21 and 21a. The condenser-type unit solar cell module 30 is similar to the above-mentioned unit solar cell modules 21 and 21a, and similar structural components will be given identical reference numerals and omitted from the description.

The condenser-type unit solar cell modules 30 include the condenser lenses 43 for gathering light, a plurality of solar cells 22, a plurality of connection wires 23 for connecting the solar cells 22, and a frame 42 for supporting these components. The condenser lenses 43 are designed to converge incident light toward the positions of the solar cells 22.

The solar cells 22 are fastened to the frame 42. The solar cells 22 are provided with electrodes that are coupled with other solar cells 22 by the connection wires 23. By supporting the condenser lenses 43 with the frame 42, a lightweight condenser-type solar panel can be formed.

The condenser-type unit solar cell modules 30 are units with a modular structure in which two or more solar cells 22 have been fastened to the frame 42 via the connection wires 23. For example, as shown in FIG. 22A, the condenser-type unit solar cell modules 30 can be made by organizing 3 cells×3 cells of the solar cells 22 for a total of 9 cells. A condenser-type solar panel for space can be assembled by combining 8×10 of the condenser-type unit solar cell modules 30, as shown in FIGS. 1A and 1B.

Alternatively, FIG. 22B shows a condenser-type unit solar cell module 30 in which the solar cells 22 are lined up at 6 cells×5 cells for a total of 30 cells. Thus, the condenser-type unit solar cell modules 30 can be designed to various shapes and power generation capabilities by changing the number of solar cells 22, the shape of the frame, or the amount of light gathered by the condenser lens, for example.

Similar to the previously mentioned unit solar cell modules 21 and 21a, relatively complicated tasks are not necessary in creating the condenser-type unit solar cell modules 30 themselves, and if the condenser-type solar panels are made by combining standardized condenser-type unit solar cell modules 30, then a variety of condenser-type solar panels can be manufactured by combining a number of identical or similarly shaped condenser-type unit solar cell modules 30 in various ways.

With conventional condenser solar panels, the number of components increased due to installation of the lens, and it was necessary to assemble the entirety of the solar panel while precisely adjusting the condenser lenses 43 and the solar cells 22, making it difficult to manufacture the solar panel. However, the solar panel can be more easily configured than was the case conventionally if the condenser-type unit solar cell modules 30 according to the invention are used.

Figure 23:
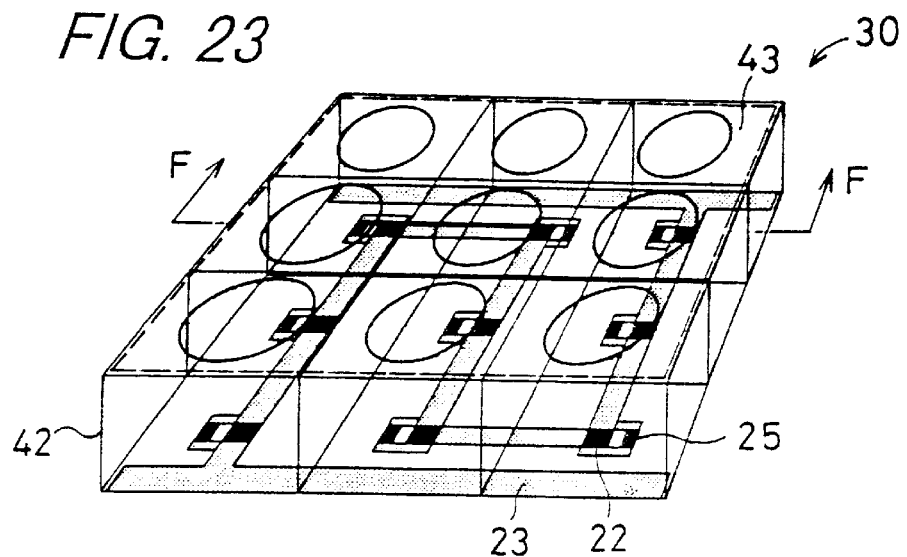
FIG. 23 is a perspective view showing the condenser-type unit solar cell module 30.

As shown in FIG. 23, the condenser-type unit solar cell modules 30 are provided with protection diodes 25 for protecting the solar cells 22, as in the previously mentioned unit solar cell modules. Thus, the solar cells 22 can be protected by bypassing the path of the current when the power generating capabilities of a portion of the solar cells 22 drops.

Figure 24:
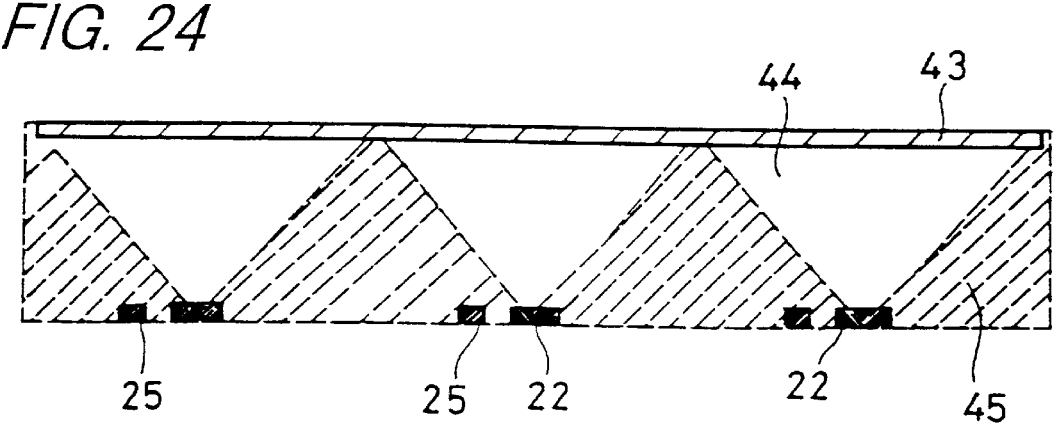
FIG. 24 is a cross sectional view of the condenser-type unit solar cell module 30 in FIG. 23 taken along the section line F—F.

FIG. 24 is a cross sectional view of the condenser-type unit solar cell modules 30 of FIG. 23 taken along the section line F—F. The solar cells 22 are located in regions 44, which are irradiated with the light collected by the condenser lenses 43, and the connection wires 23 and the protection diodes 25 are located in regions 45, which are not irradiated with the collected light. Thus, components arranged in the non-irradiated regions 45, such as the protection diodes 25 and the connection wires 23, for example, can be protected from deteriorating due to the light.

Figure 25:
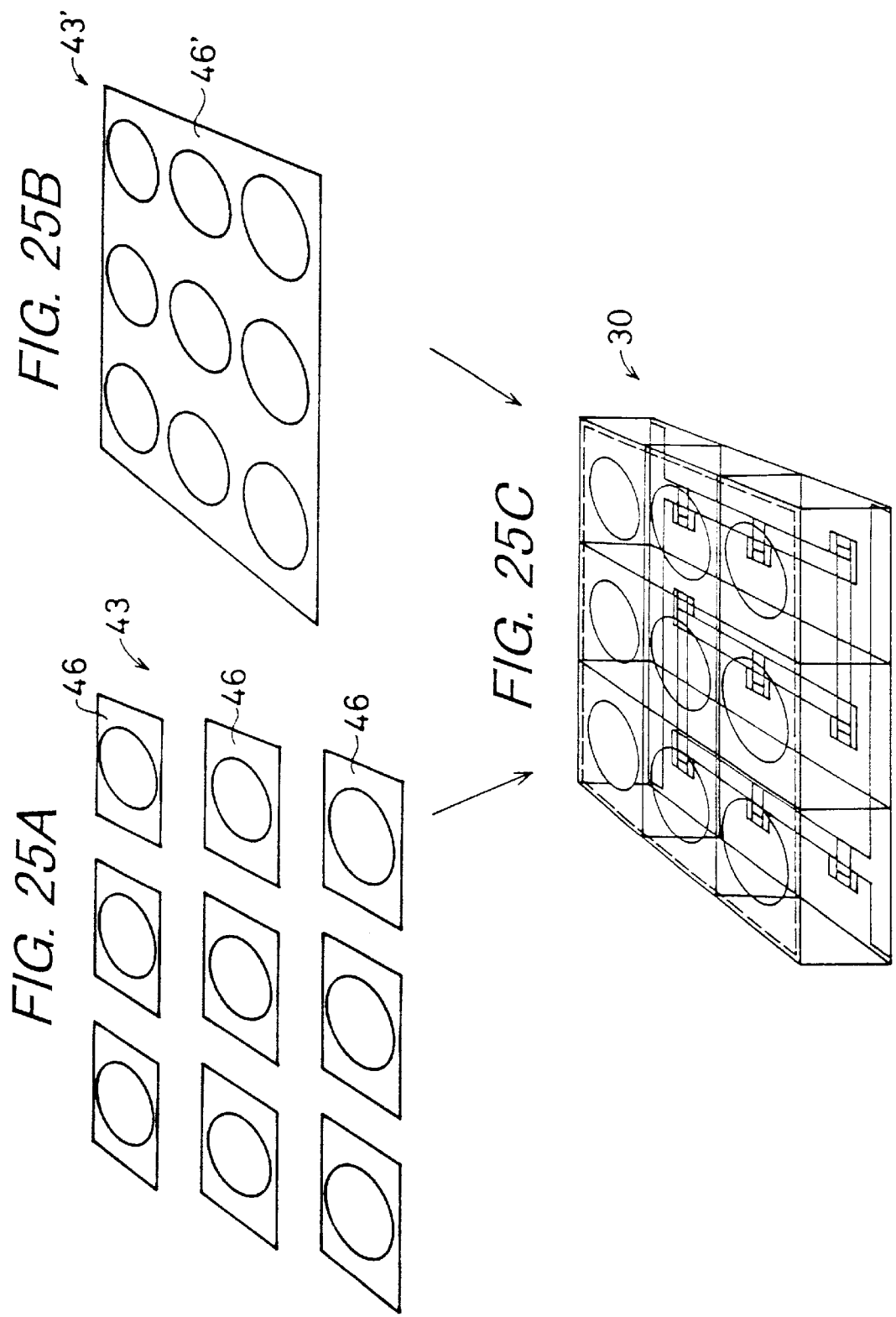
FIGS. 25A to 25C are perspective views showing the lens plate 46 of the condenser-type unit solar cell module 30.

The condenser lenses 43 are made of a plate-shaped lens plate 46, for example, and as shown in FIG. 25A, have one focal point per lens plate 46. As shown in FIG. 25C, the condenser-type unit solar cell modules 30 can be configured by combining the same number of lens plates 46 as solar cells 22 (nine plates in FIGS. 25A to 25C) and arranging the solar cells 22 at positions corresponding to the focal point of each lens plate 46.

Alternatively, as shown in FIG. 25B, the condenser lenses 43' can also have a plurality of non-consecutive focal points per single lens plate 46'. Consequently, as shown in FIG. 25C, it is possible to configure the condenser-type unit solar cell modules 30 by arranging the solar cells 22 to correspond to these focal points. Thus, the number of components for the condenser-type unit solar cell modules 30 can be reduced.

These condenser-type unit solar cell modules 30, like the previously mentioned unit solar cell modules 21, are linked together in a matrix to form condenser-type solar panels. Means for arranging the condenser-type unit solar cell modules 30 can form a condenser-type solar panel by detachably accommodating the condenser-type unit solar cell modules 30 in the accommodation spaces 27 of the frame body 26, as shown in FIG. 4 through FIG. 14B, for example.

Figure 26:
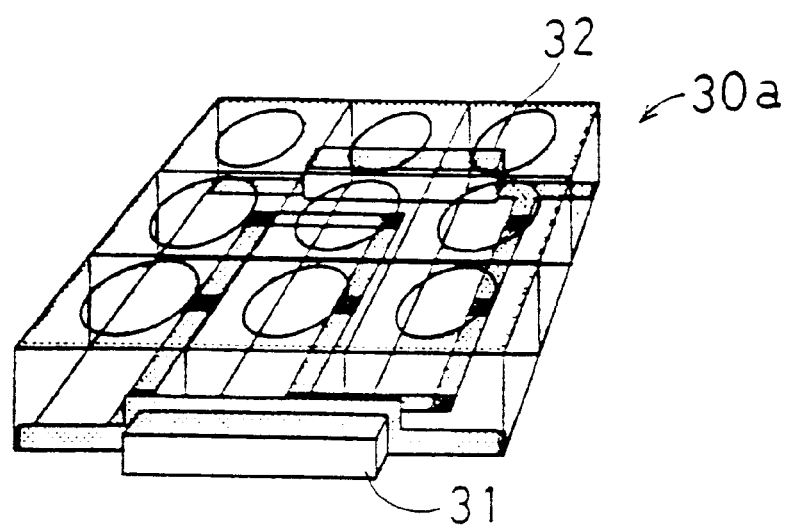
Figure 27:
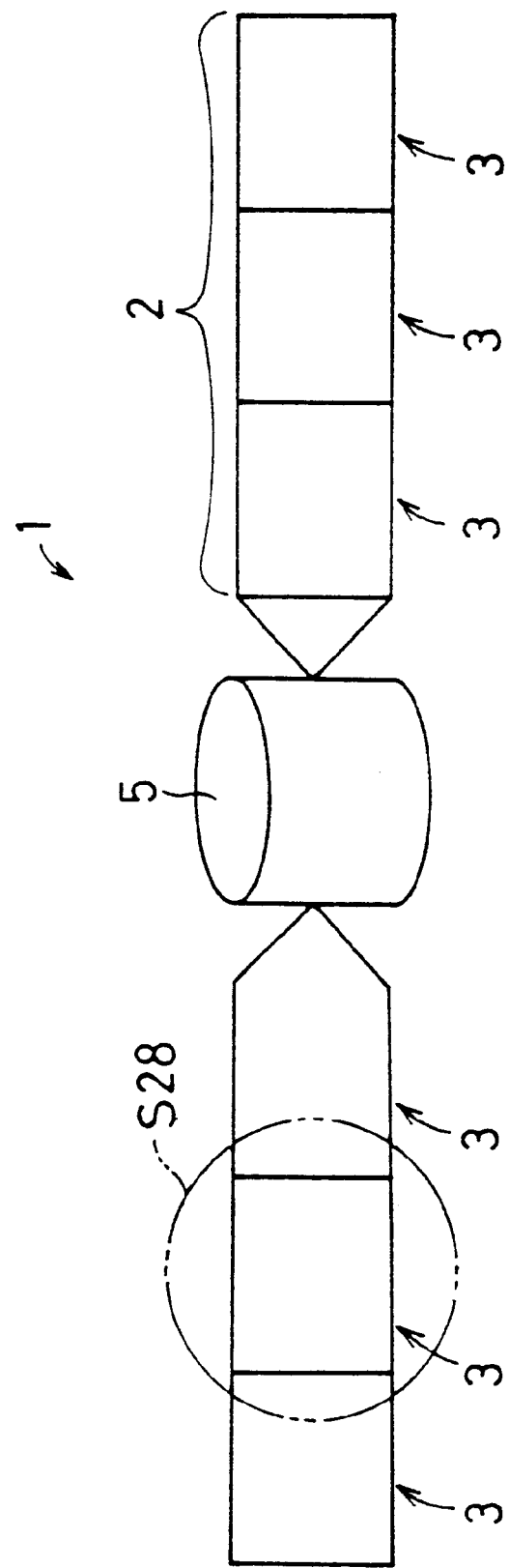
FIG. 27 is a perspective view showing a conventional artificial satellite 1.
Figure 28:
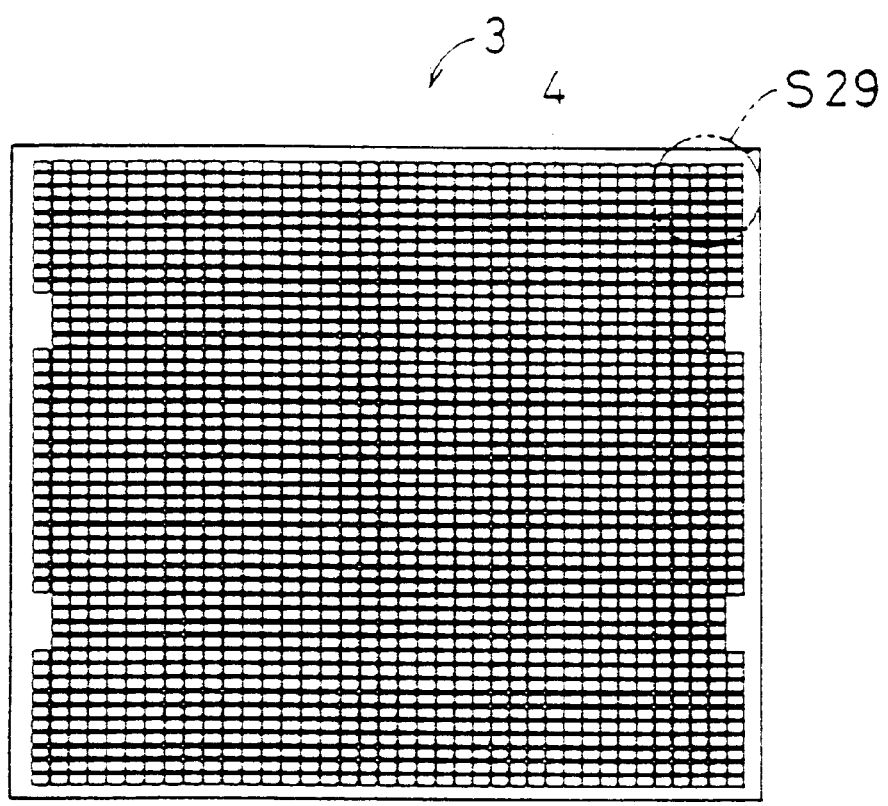
FIG. 28 is an enlarged view of section S28 of the solar panel 3 in FIG. 27.
Figure 29:
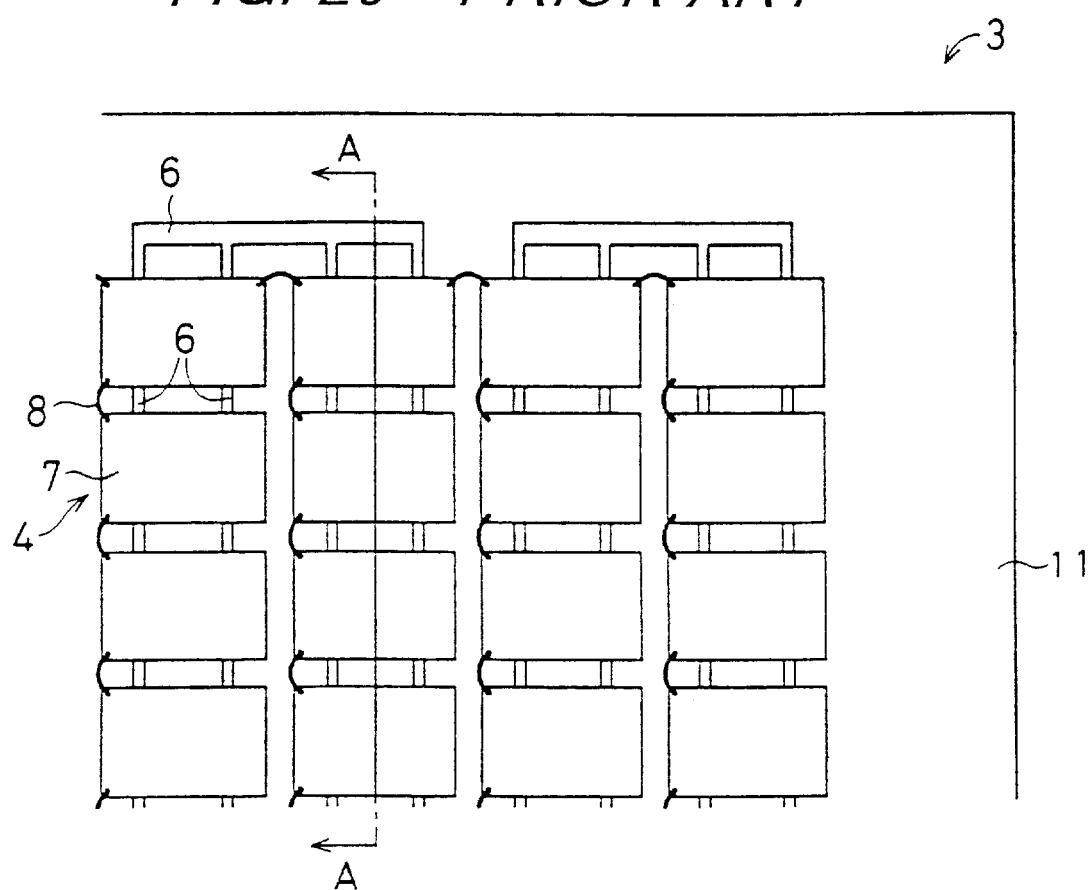
FIG. 29 is an enlarged view of section S29 of the solar panel 3 in FIG. 28.
Figure 30:
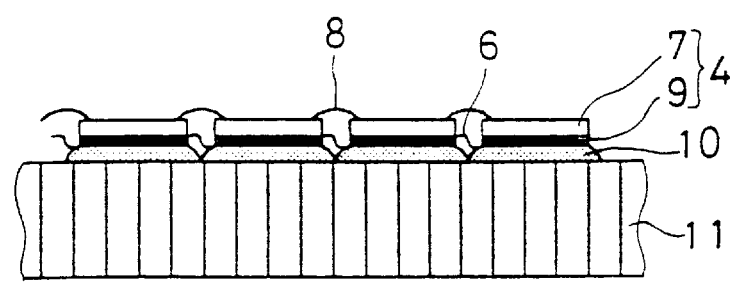
FIG. 30 is a cross sectional view of the solar panel 3 in FIG. 29 taken along the section line A—A.

Furthermore, the surface of the condenser lenses 43 and 43' can be prevented from becoming charged by coating the surface of the condenser lenses 43 on their light receiving side with a light transmitting, conductive layer 34 that is connected to the spacecraft ground, and electrically connecting the conductive layer 34 to the ground conduction paths 41, Moreover, as shown in FIGS. 15 to 19, the condenser-type unit solar cell modules 30 can also be organized on the substrate 36 to form a condenser-type solar panel. As shown in FIG. 26, it is also possible to provide the condenser-type unit solar cell modules with a protruding portion 31 on one side portion and a recessed portion 32 on the opposite side to form condenser-type unit solar cell modules 30a that can be mechanically linked by joining them to one another, thus forming a condenser-type solar panel.

In the above-mentioned solar panels for use in space, when a portion of the solar cells 22 is damaged, the solar panel is repaired or adjusted by removing and replacing the unit solar cell module or the condenser-type unit solar cell module to which the damaged solar cell 22 is attached. Because the unit solar cell modules or the condenser-type unit solar cell modules are detachably attached and can be electrically connected/disconnected by mechanically separating/connecting them, repairs or adjustments to the solar panels are extremely easy to perform using this method for the replacement of modules.

The above embodiments are merely examples and can be altered within the scope of the invention. For example, in the above-mentioned embodiments, the solar panel was for use in an artificial satellite, however the invention is not limited thereto, and the solar panel can be suitably used in all space applications.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A solar panel for use in space comprising:
a supporting frame member including an array of receiving apertures or cut-out spaces defined therein,
a plurality of unit solar cell modules, each solar cell module including a plurality of solar cells and connection wires for connecting the solar cells,
wherein each of a plurality of the receiving apertures or cut-out spaces defined in the supporting frame member receives at least a part of a corresponding unit solar cell module so that respective unit solar cell modules are mounted in corresponding receiving apertures or cut-out spaces defined in the frame member, and
wherein an entirety of the solar panel for use in space is configured by linking the plurality of unit solar cell modules and the linking of the unit solar cell modules electrically connects the unit solar cell modules to one another.

2. The solar panel for use in space of claim 1, wherein the unit solar cell modules are linked by detachable means.

3. The solar panel for use in space of claim 1, wherein a bypass diode for protecting the solar cells with respect to a reverse bias is installed in the unit solar cell modules.

4. The solar panel for use in space of claim 1, where n the supporting frame member has a honeycomb structure of which principal material is aluminum, and that the solar cells are fastened to this supporting frame member.

5. The solar panel for use in space of claim 1, wherein the entire of the solar panel is configured by fitting the unit solar cell modules into accommodating spaces for accommodating the unit solar cell modules which are provided in the supporting frame member.

6. The solar panel for use in space of claim 1, wherein the unit solar cell modules have a structure with which they can be mechanically linked to one another, and that the entirety of the solar panel is configured by mechanically linking the unit solar cell modules to one another.

7. A solar panel for use in space comprising:
a plurality of unit solar cell modules, each solar cell module including a plurality of solar cells and connection wires for connecting the solar cells,
wherein the solar panel for use in space is configured by linking the plurality of unit solar cell modules and the linking of the unit solar cell modules electrically connects the unit solar cell modules to one another, and
wherein mechanical structure linking the unit solar cell modules to one another includes a protruding portion provided on one side of each of the unit solar cell modules and a recessed portion provided on another side of each of the unit solar cell modules.

8. The solar panel for use in space of claim 5, wherein the frame member includes ground conduction paths for electrically connecting a light receiving side surface of each of the unit solar cell modules to a spacecraft ground.

9. The solar panel for use in space of claim 5, wherein a plurality of unit solar cell modules interconnected is lined with a resin film.

10. The solar panel for use in space of claim 5, wherein a plurality of unit solar cell modules interconnected is lined with a resin film.

11. The solar panel for use in space of claim 6, wherein a plurality of unit solar cell modules interconnected is lined with a resin film.

12. The solar panel for use in space of claim 6, wherein a plurality of unit solar cell modules interconnected is lined with a resin film.

13. The solar panel for use in space of claim 1, wherein the unit solar cell modules are provided with condenser lenses for gathering light into the solar cells.

14. The solar panel for use in space of claim 13, wherein the unit solar cell modules are provided with a frame for supporting the condenser lenser, the solar cells, and the connection wires.

15. The solar panel for use in space of claim 13, wherein the condenser lenses have a plurality of non-consecutive focal points with respect to a single lens plate, and that the solar cells are arranged at positions corresponding to those focal points.

16. The solar panel for use in space of claim 13, wherein the connection wires and a bypass diode for protecting the solar cells with respect to a reverse bias are disposed in regions which are not irradiated with light gathered by the condenser lenses.

17. The solar panel for use in space of claim 13, wherein a surface of the condenser lenses is coated with a light transmitting, conductive thin film that is connected to a spacecraft ground.

18. A method for manufacturing a solar panel for space use includes:
providing a supporting frame member including an array of receiving apertures or cut-out spaces defined therein,
mounting respective unit solar cell modules in corresponding receiving apertures or cut-out spaces defined in the supporting frame member,
configuring an entirety of the solar panel for use in space by detachably linking the plurality of unit solar cell modules, which each include a plurality of solar cells and connection wires for connecting the solar cells, thereby electrically connecting the unit solar cell modules to one another, and
repairing or adjusting the solar panel by removing and exchanging a portion of the linked unit solar cell modules.

19. The solar panel of claim 1, wherein a wall is defined between first and second adjacent receiving apertures or cut-out spaces defined in the frame member, and a conductor is provided at a top surface of said wall; and
wherein the conductor provided at the top surface of said wall is in conductive contact with respective conductors of first and second unit solar cell modules which are mounted in the first and second adjacent receiving apertures or cut-out spaces, respectively, so that the first and second unit solar cell modules are in electrical communication with one another via the conductor provided at the top surface of said wall.

20. The solar panel of claim 1, wherein each of the plurality of the receiving apertures or cut-out spaces defined in the supporting frame member receives a protrusion extending from a corresponding unit solar cell module so that respective unit solar cell modules are mounted in corresponding receiving apertures or cut-out spaces defined in the frame member via respective protrusions.

21. A solar panel for use in space comprising:

a supporting frame member including an array of receiving areas or receiving respective unit solar cell modules, wherein each unit solar cell module includes a plurality of solar cells, a conductor provided at a top surface of a wall located between adjacent first and second receiving areas of the supporting frame member; and wherein the conductor provided at the top surface of said wall is in conductive contact with respective conductors of first and second unit solar cell modules which are mounted in the first and second adjacent receiving areas, respectively, so that the first and second unit solar cell modules are in electrical communication with one another via the conductor provided at the top surface of said wall.

22. A solar panel for use in space comprising:

a supporting frame member including an array of receiving areas for receiving respective unit solar cell modules, wherein each unit solar cell module includes a plurality of solar cells, a conductor provided between adjacent first and second receiving areas of the supporting frame member; and wherein the conductor provided between adjacent first and second receiving areas is in conductive contact with respective conductors of first and second it solar cell modules which are mounted in the first and second adjacent receiving areas, respectively, so that the first and second unit solar cell modules are in electrical communication with one another via the conductor provided between the adjacent first and second receiving areas.

23. A solar panel for use in space comprising:

a plurality of unit solar cell modules including a plurality of solar cells and connection wires for connecting the solar cells, wherein the solar panel for use in space is configured by linking the plurality of unit solar cell modules, and the linking of the unit solar cell modules electrically connects the unit solar cell modules to one another, and wherein each of a plurality of the unit solar cell modules have a structure with which they can be mechanically linked to one another in a contacting manner, so that the solar panel is configured by mechanically linking the unit solar cell modules to one another.

24. The solar panel of claim 23, wherein said structure with which the modules can be mechanically linked to one another comprises a protruding portion (31) of one solar cell module which is inserted into a recessed portion (32) of an adjacent solar cell module.

* * * * *